US011311114B1

(12) United States Patent
Fleisher et al.

(10) Patent No.: US 11,311,114 B1
(45) Date of Patent: Apr. 26, 2022

(54) PLASTIC DRIVE CADDY ASSEMBLY

(71) Applicant: Pavilion Data Systems, Inc., San Jose, CA (US)

(72) Inventors: Eugene Fleisher, San Jose, CA (US); Ray Siruno, San Jose, CA (US)

(73) Assignee: Pavilion Data Systems, Inc., San Jose, CA (US)

( * ) Notice: Subject to any disclaimer, the term of this patent is extended or adjusted under 35 U.S.C. 154(b) by 0 days.

(21) Appl. No.: 17/095,645

(22) Filed: Nov. 11, 2020

(51) Int. Cl.
| H01R 13/00 | (2006.01) |
| A47C 27/06 | (2006.01) |
| H01R 13/11 | (2006.01) |
| H04L 49/356 | (2022.01) |

(52) U.S. Cl.
CPC ............ *A47C 27/065* (2013.01); *H01R 13/11* (2013.01); *H04L 49/357* (2013.01)

(58) Field of Classification Search
CPC ......... A47C 27/06; A47C 27/04; A47C 27/00; H01R 13/11; H01R 13/10; H01R 13/02; H01R 13/00; H01R 24/66; H01R 9/03; H01R 12/727; H01R 12/721; H01R 12/72; H01R 12/71; H01R 12/70; H01R 12/7005; H01R 12/7023; H01R 12/7029; H01R 12/7035
USPC ........ 439/839; 361/679.01, 679.02, 616, 617
See application file for complete search history.

(56) References Cited

U.S. PATENT DOCUMENTS

| 4,600,258 | A | * | 7/1986 | Hu | ........................ | H01R 13/447 |
| | | | | | | 439/135 |
| 5,161,988 | A | * | 11/1992 | Krupka | ................ | H01R 13/518 |
| | | | | | | 200/50.28 |
| 6,155,850 | A | * | 12/2000 | Martin | ............. | H01R 13/62911 |
| | | | | | | 439/157 |
| 6,183,279 | B1 | * | 2/2001 | Murakami | ....... | H01R 13/62905 |
| | | | | | | 439/157 |
| 6,461,195 | B2 | * | 10/2002 | Chang | ................ | H01R 13/7137 |
| | | | | | | 200/51 R |
| 6,652,297 | B1 | * | 11/2003 | Zhang | .................. | H01R 13/447 |
| | | | | | | 361/679.02 |
| 7,651,346 | B2 | * | 1/2010 | Francis | ................ | H01R 13/447 |
| | | | | | | 439/136 |
| 7,791,865 | B2 | * | 9/2010 | Wirtzberger | ......... | H05K 7/1457 |
| | | | | | | 361/679.01 |
| 7,837,484 | B2 | * | 11/2010 | Wu | ..................... | H01R 13/4534 |
| | | | | | | 439/136 |
| 9,059,536 | B2 | * | 6/2015 | Tseng | ................. | H01R 13/5213 |
| 9,565,936 | B2 | * | 2/2017 | Chen | ..................... | A47B 88/57 |
| 10,467,163 | B1 | | 11/2019 | Malwankar et al. | | |

(Continued)

*Primary Examiner* — Harshad C Patel
(74) *Attorney, Agent, or Firm* — Lowenstein Sandler LLP

(57) ABSTRACT

A drive caddy assembly comprises a plastic frame and a plastic faceplate that includes a plastic tab and a plastic spring that moves along a spring axis that is perpendicular to a longitudinal axis of the drive caddy assembly. The plastic spring is configured to compress from a resting state along the spring axis without moving perpendicular to the spring axis during insertion of the drive caddy assembly into a drive receptacle of a storage server, and is further configured to return to the resting state when the drive caddy assembly is fully seated in the drive receptacle. The plastic tab extends from a side of the plastic spring and is configured to engage with the drive receptacle in a manner that translates a force on the drive caddy assembly along the longitudinal axis into a force on the plastic spring along the spring axis.

19 Claims, 18 Drawing Sheets

(56) References Cited

U.S. PATENT DOCUMENTS

| | | | |
|---|---|---|---|
| 10,651,576 B2* | 5/2020 | Chen | H01R 13/6273 |
| 10,785,882 B2* | 9/2020 | Tsujiya | H05K 5/0052 |
| 11,024,998 B2* | 6/2021 | Waterman | H01R 13/187 |
| 2002/0131241 A1* | 9/2002 | Boyer | H05K 5/0256 |
| | | | 361/724 |
| 2004/0125557 A1* | 7/2004 | Rahmouni | G06F 1/184 |
| | | | 361/679.02 |
| 2012/0329296 A1* | 12/2012 | Hara | B60R 16/0238 |
| | | | 439/76.1 |
| 2015/0011118 A1* | 1/2015 | Matsunaga | H01R 13/22 |
| | | | 439/527 |
| 2015/0132977 A1* | 5/2015 | Kanou | H05K 5/0069 |
| | | | 439/78 |
| 2015/0333303 A1* | 11/2015 | Hachiya | H01M 50/502 |
| | | | 429/90 |

* cited by examiner

PLASTIC DRIVE CADDY ASSEMBLY

FIELD OF TECHNOLOGY

This disclosure relates generally to the field of data storage and in particular to a plastic drive caddy for use in a storage server.

BACKGROUND

Networked storage arrays may provide an enterprise level solution for secure and reliable data storage. Drive caddies may be used for storage devices that are inserted into storage servers. However, traditional drive caddies for enterprise class storage are expensive to manufacture and occupy valuable space within storage servers. Additionally, traditional drive caddies designed for insertion into small spaces cause the drive caddy (and storage device attached to the drive caddy) to be inserted at a slight angle, and then straightened out during insertion and removal of the drive caddy from a storage server. This process causes uneven forces to be exerted on the contacts of the drive caddy and/or the storage device, which eventually leads to a degradation and/or failure of the contacts of the drive caddy and/or storage device. Moreover, traditional drive caddies are often improperly seated during insertion into a storage device, resulting in poor electronic contact and reduced performance and/or failure of a storage device to recognize the storage device in the drive caddy.

BRIEF DESCRIPTION OF THE DRAWINGS

The embodiments described herein will be understood more fully from the detailed description given below and from the accompanying drawings.

DETAILED DESCRIPTION

Figure 1:
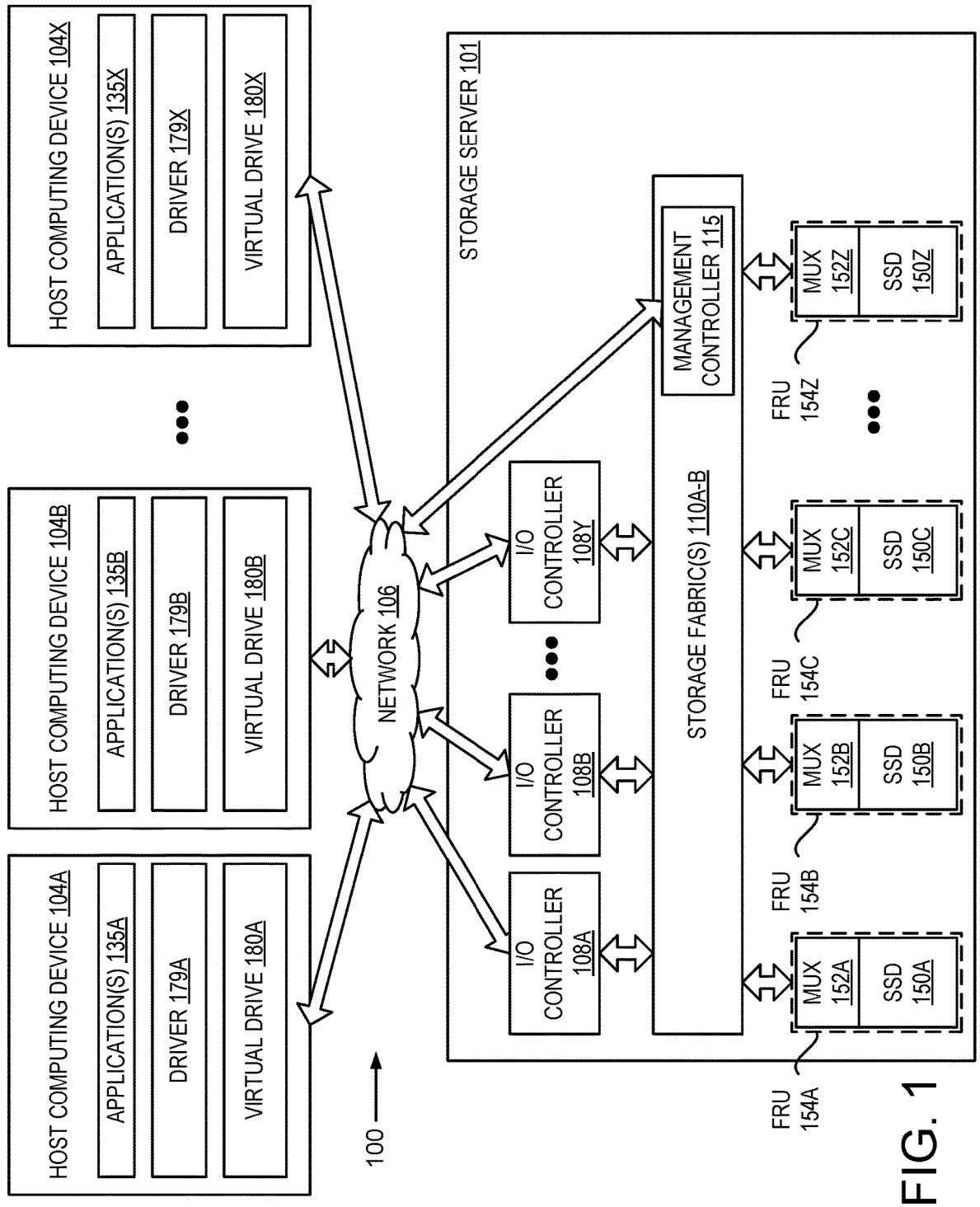
FIG. 1 is a block diagram example of a data center network architecture, in which embodiments described herein may operate.

Described herein are embodiments of a drive caddy assembly (also referred to as a drive carrier assembly) for use in a storage server. The drive caddy assembly may be made entirely from plastic, except for an optional printed circuit board (PCB) attached to the drive caddy assembly. In embodiments, the drive caddy assembly may include a plastic frame (also referred to as a plastic drive caddy base) and an attached plastic faceplate. The drive caddy assembly may further include a plastic light pipe attached to the plastic frame and a PCB attached to the plastic frame, where the PCB may include ports, light sources and/or a solid state drive (SSD) multiplexer that can selectively connect an SSD to multiple different transport fabrics (also referred to as backplane fabrics or simply fabrics). Each connection to a transport fabric may be a full bandwidth connection that utilizes all lanes of a port on the SSD. Thus, the SSD multiplexer may be plugged into an SSD to provide full bandwidth redundant paths to the SSD. The SSD multiplexer enables an SSD to have both high availability and full bandwidth. Thus, the SSD may maintain a full bandwidth connection to controllers and/or hosts at all times, even in the event of a fabric failure.

In one embodiment, the drive caddy assembly includes a plastic frame and a plastic faceplate attached to the plastic frame. In one embodiment, the plastic faceplate comprises a plastic spring that moves along a spring axis that is perpendicular to a longitudinal axis of the drive caddy assembly, wherein the plastic spring is configured to compress from a resting state along the spring axis without moving perpendicular to the spring axis during insertion of the drive caddy assembly into a drive receptacle of a storage server, and wherein the plastic spring is further configured to return to the resting state when the drive caddy assembly is fully seated in the drive receptacle. The plastic faceplate further includes a first plastic tab extending from a side of the plastic spring, wherein the first plastic tab is configured to: a) engage with the drive receptacle in a manner that translates a force on the drive caddy assembly along the longitudinal axis applied during insertion of the drive caddy assembly into the drive receptacle into a force on the plastic spring along the spring axis, and b) interface with a slot of the drive receptacle to secure the plastic drive caddy assembly and the storage device to the receptacle when the drive caddy is fully seated in the drive receptacle and the plastic spring is in the resting state.

According to some embodiments, the drive caddy assembly provides multiple advantages over traditional drive caddies. As an initial matter, the drive caddy assembly is constructed of 2-3 plastic parts that can be easily assembled without use of screws, glues, rivets, and so on. The plastic parts may be snap fit together in embodiments. A PCB may be screwed to the drive caddy assembly or snap fit to the drive caddy assembly. The use of plastic parts and the simplification in assembly reduces the time required to assemble the drive caddy assembly and reduces the overall cost of the drive caddy assembly both in terms of material costs and labor costs.

According to some embodiments, the drive caddy assembly includes an all-plastic engagement feature that includes a plastic spring and one or more plastic tabs and/or slots. The all-plastic engagement feature is configured to translate a force applied in a longitudinal direction of the drive caddy assembly during insertion of the drive caddy assembly into a drive receptacle of a storage server into a force along a spring axis of the plastic spring, which may be perpendicular to the longitudinal axis. When the drive caddy assembly is fully seated in the drive receptacle, the plastic spring returns to its resting state, and a plastic tab of the drive caddy assembly engages with a slot of the drive receptacle to secure the drive caddy assembly to the drive receptacle. The all-plastic engagement feature enables the drive caddy assembly to take up minimal space within the storage server while still providing a secure attachment mechanism for attaching the drive caddy assembly to the storage server. Additionally, the all-plastic engagement feature enables the drive caddy assembly to be inserted into and removed from a drive receptacle of a storage server without the use of any tools. The drive caddy assembly may not be an enclosure in some embodiments (e.g., may not enclose the SSD or may only partially enclose the SSD). The use of drive caddy assemblies according to embodiments increases possible density of SSDs in the storage server. The SSDs may have any form factor, such as a form factor for a 2.5" drive, for an EDSFF drive, for an NGSFF drive, and so on. The SSDs may have thicknesses of 7 mm, 9 mm, 15 mm, or other thicknesses. Different SSDs may have different thicknesses.

The drive caddy assembly may be configured such that it can be inserted and removed vertically without imposing any horizontal force or rotational force on the drive caddy assembly (e.g., on pins of a PCB of the drive caddy assembly that plug into a port of a storage server backplane or on pins of an SSD). This may prolong a life of the drive caddy assembly and/or of an SSD attached thereto.

FIG. 1 is a block diagram example of a data center network architecture 100, in which embodiments described herein may operate. The data center network architecture 100 may include one or more host computing devices (e.g., host computing devices 104A, 104B through 104X) connected to a storage server 101 via a network 106. Network 106 may be a wide area network (WAN) such as the Internet, a local area network (LAN), a storage area network (SAN) or a combination thereof. The host computing devices 104A-X and/or storage server 101 may connect to the network 106 via an Ethernet, Fibre Channel (FC), Fibre channel over Ethernet (FCoE), serial attached small computer system interface (SAS) or serial ATA (SATA) protocol. Alternatively, other protocols may be used to connect to the network 106.

Storage server 101 is a computing device that is configured and optimized to provide storage to remote computing devices (e.g., to host computing devices 104A-X). Storage server 101 may be configured as part of a storage area network (SAN), network attached storage (NAS), or other remote storage type. Though a single storage server 101 is shown, the host computing devices 104A-X may connect to multiple storage servers. The multiple storage servers may be arranged in a cluster or other configuration.

Storage server 101 includes one or more backplane (not shown) and/or mid-plane (not shown) to which other components of the storage server 101 may connect. A backplane is a board to which main circuit boards of a computing device may be connected and that provides connections between them. A backplane consists of a group of electrical connectors in parallel with each other, so that each pin of each connector may be linked to the same relative pin of all the other connectors, forming a computer bus. The backplane may be used to connect several printed circuit boards together to make up a complete computer system (e.g., a complete storage server).

Storage server 101 includes multiple input/output (I/O) controllers 108A, 108B through 108N connected to multiple solid state drives (SSDs) 150A, 150B, 150C through 150Z via one or more storage fabrics 110A-B. Each storage fabric 110A-B includes hardware (e.g., switches, etc.) that connects IO controllers 108A-Y to SSDs 150A-Z. Each storage fabric 110A-B may include a fabric board (e.g., a printed circuit board (PCB) that includes multiple hardware components. Each storage fabric 110A-B enables any IO controller 108A-Y to connect to any SSD 150A-Z. Each storage fabric 110A-B may be independent of other storage fabrics, using its own hardware, ports, connections, etc. that are distinct from those used by the other storage fabrics. Accordingly, if any component in a storage fabric 110A-B fails and causes that storage fabric to fail, the TO controllers 108A-Y may continue to maintain connections to the SSDs 150A-Z via an alternative storage fabric. In one embodiment, each of the fabrics 110A-B is an FRU that can be removed from the storage server 105 and swapped out with a new replacement fabric.

In one embodiment, storage server 105 includes a first storage fabric 110A and a second storage fabric 110B. In alternative embodiments, storage server 105 may include more than two storage fabrics. First storage fabric 110A and second storage fabric 110B manage the flow of data within storage server 105 by connecting specific TO controllers 108A-Y to specific SSDs 150A-Z on a message by message basis, allowing the storage fabrics 110A-B to regulate the flow of traffic. Each storage fabric 110A-B may include its own connectors, ports, hardware (e.g., switches), and so on that are separate and distinct from those of other storage fabrics. For example, first storage fabric 110A may include a first fully connected mesh topology that may include a first switch layer and a second switch layer. Additionally, second storage fabric 110B may include a second fully connected mesh topology that includes a first switch layer and a second switch layer. The first and second switch layers of the first fabric may each be connected in such a way as to provide the fully connected mesh topology. Similarly, first and second switch layers of the second fabric may each be connected in such a way as to provide the fully connected mesh topology. In one embodiment, the fully connected mesh topology is a fully connected serial computer expansion bus network, such as a fully connected peripheral component internet express (PCIe) network. The first and second fabrics may provide parallel paths between the IO controllers and the SSDs, where at any given moment some IO controllers may read from and write to one or more SSDs using the first fabric and some IO controllers may read from and write to the same or different SSDs using the second fabric. Accordingly, both fabrics may be active in parallel, with each fabric managing some portion of an IO load. Each fabric may also act as a backup fabric in case the other fabric fails.

Each I/O controller 108A-Y is a device configured to connect one or more host computing devices 104A-X to one or more SSDs 150A-Z. Each I/O controller 108A-Y includes one or more network interface controllers (NICs) such as Ethernet NICs and/or other protocol adapters (e.g., such as FC, SAS/SATA, or Infiniband (IB) adapters) that connect that I/O controller to network 106. Each I/O controller 108A-Y additionally includes a port that connects to transport fabric 110 via an internal bus. In one embodiment, I/O controllers 108A-Y include peripheral component interconnect express (PCIe) ports that connect to transport fabric 110 via a PCIe bus. Alternatively, or additionally, I/O controllers 108A-Y may include small computer system interface (SCSI) ports, serial attached SCSI (SAS) ports, serial ATA (SATA) ports, Fibre Channel ports, or universal serial bus (USB) ports or other ports for connecting to the transport fabric 110. I/O controllers 108A-Y may additionally include a volatile and/or non-volatile memory to store firmware and/or software for performing operations such as routing read and write requests to the correct SSDs 150A-Z. Volatile memory may also be used for a data cache or buffer (e.g., as a write cache and/or a read look ahead cache). For example, I/O controllers 108A-Y may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.).

I/O controllers 108A-Y may additionally include a processing device representing one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core central processing unit (CPU), a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, graphical processing unit (GPU), processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In one embodiment, each I/O controller 108A-Y is a system on a chip (SoC) including a processing device, a memory, one or more NICs and one or more internal ports.

Each I/O controller 108A-Y is assigned to one or more host computing devices 104A-X, and handles input/output (I/O) commands for those host computing devices. Applications 135A-X running on a host computing device 104A-X may attempt to read data from and/or write data to a virtual drive 180A-X that the host computing device 104A-X has access to. Responsive to such a read or write request, a driver 179A-X running on the host computing device 104A-X encapsulates a read or write command into a message (e.g., into an Ethernet packet) and sends the message to the I/O controller 108A-Y that is assigned to that host computing device 104A-X.

When the I/O controller 108A-Y receives the read or write command from the host computing device 104A-X, the I/O controller 108A-Y extracts the read or write command from the message and determines what logical addresses of the virtual drive 180A-X should be used to write the data to or read the data from. The I/O controller 108A-Y may additionally translate the logical addresses of the virtual drive to physical addresses of the SSDs 150A-Z. For example, if a read command was received, the I/O controller 108A-Y may determine which SSDs 150A-Z store the information to be read as well as which physical addresses on those SSDs the data should be read from. In another example, if a write command was received, the I/O controller 108A-Y may determine which SSDs 150A-Z to write portions of received data to as well as which physical addresses of those SSDs 150A-Z to write the data to. The I/O controller 108A-Y may then generate one or more commands directed to the determined SSDs 150A-Z to write data to those SSDs or read data from those SSDs 150A-Z.

I/O controllers 108A-Y may additionally include array configuration information for the SSDs 150A-Z that may be used to reconstruct a portion of one or more virtual drives 180A-X so that data referenced by the virtual drives 180A-X can be retrieved if one or more of the SSDs 150A-Z becomes unavailable.

Each solid state drive (SSD) 150A-Z (also referred to as a solid state storage device) is a non-volatile storage device that uses integrated circuits to persistently store data. SSDs 150A-Z have numerous advantages over traditional disk drives. As compared to disk drives, SSDs are more resilient, consume less power, and have lower latency (access times). In one embodiment, SSDs 150A-Z are NAND-based Flash memory devices or NOR-based Flash memory devices. Flash memory devices are non-volatile and can be electronically erased and reprogrammed. Alternatively, one or more SSDs 150A-Z may be volatile memory-based solid state drives (e.g., dynamic random access memory (DRAM)-based SSDs) that have a battery backup. In one embodiment, the SSDs 150A-Z are NVMe drives.

The SSDs 150A-Z may be SAS/SATA drives, PCIe drives, non-volatile memory express (NVMe) drives, small computer system interface (SCSI) over PCIe (SOP) drives, or solid state drives that communicate using different protocols. NVMe drives are PCIe-based solid state storage devices that uses the NVMe protocol. NVMe is a scalable host controller interface for PCIe-based solid state drives, which is based on a paired submission and completion queue mechanism. For NVMe, commands are placed by hosts into a submission queue. Completions are placed into an associated completion queue by the host controller. The number of SSDs included in storage server 101 may be less than 10 to more than 100. The solid state drives may have the same or different storage capacities.

SSDs 150A-Z typically include a single physical port (e.g., a PCIe port) to connect to the backplane. This single port may be a peripheral component interconnect express (PCIe) port, a SCSI port, a SAS port, a SATA port, a Fibre Channel port, or a USB port, for example. The port on the SSDs 150A-Z permits either a single full bandwidth connection to a single transport fabric or storage server or partial bandwidth connections to multiple transport fabrics or storage servers. However, the SSDs 150A-Z are not natively capable of full bandwidth connections to multiple different transport fabrics or multiple different storage servers.

Accordingly, in embodiments each SSD 150A-150Z is connected to (e.g., plugged into) a different SSD multiplexer (MUX) 152A, 152B, 152C through 152N. Each SSD multiplexer 152A-Z includes a pair of ports and a multiplexer. A first port connects to the SSD 150A-Z, and a second port connects to the backplane, and through the backplane to transport fabric 110 (or to multiple different switches of multiple different transport fabrics). The SSD multiplexers 152A-Z enable the SSDs 150A-Z to have full bandwidth connections to multiple different transport fabrics, thus enabling high availability at full bandwidth.

Each pair of an SSD 150A-Z and an attached MUX 152A-Z may form a single field replaceable unit (FRU) 154A, 154B, 154C through 154N. Each FRU 154A-Z may include an SSD, a MUX and a drive caddy assembly to which the SSD 150A-Z and the MUX 152A-Z are attached.

In some embodiments, the MUX 152A-Z is omitted, and each FRU 154A-Z includes an SSD 150A-Z attached to a drive caddy assembly. Each FRU 154A-Z can be hot plugged and hot unplugged from the storage server 101 as a single unit. To hot plug an SSD means to plug the SSD into the storage server 101 while the storage server is running. To hot unplug an SSD means to unplug (remove) the SSD from the storage server 101 while the storage server 101 is running. In one embodiment, the SSD multiplexer is integrated into the SSD (e.g., is a component of the SSD).

Storage server 101 additionally includes a management controller 115 integrated into or attached to each of the storage fabrics 110A-B. Management controller 115 may be a device configured to perform particular operations with regards to management of the array of SSDs 150A-Z, management of I/O controllers 108A-Y and so on. Management controller 115 may include a processing device, a port for connecting to transport fabric 110 and a network interface card (NIC) for connecting to network 106. Management controller 115 may additionally include a volatile and/or non-volatile memory to store firmware and/or software for performing operations described herein. In one embodiment, management controller 115 is a SoC.

The management controller 115 determines how to configure the array of SSDs 150A-Z and further determines configurations for one or more virtual drives 180A-X. For example, management controller 115 may determine which virtual drives map to which physical SSDs and which portions of those SSDs the virtual drives map to. Once these configurations are determined, management controller 115 may send these configurations to the I/O controllers 108A-Y for implementation. Management controller 115 may additionally participate in discovery operations and may be responsible for pairing I/O controllers 108A-Y with host computing devices 104A-X.

Host computing devices 104A-X may each include a physical machine and/or a virtual machine hosted by a physical machine. The physical machine may be a rackmount server, a desktop computer, or other computing device. In one embodiment, one or more host computing device 104A-X includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Each host computing device 104A-X may host one or more applications 135A, 135B through 135X. The applications 135A-X may be application servers, web servers, standalone applications, and so forth. Accordingly, host computing devices 104A-X may provide services to clients via applications 135A-X in some embodiments.

Each host computing device 104A-X may additionally mount or otherwise connect to one or more virtual drives 180A, 180B through 180X (e.g., one or more logical unit numbers (LUNs) and/or one or more virtual NVMe drives). Though each host computing device 104A-X is shown to mount a different virtual drive 180A-X, different host computing devices may mount or connect to the same virtual drive. Each virtual drive 180A-X is a logical storage device that maps a logical storage address space to physical storage address spaces of multiple storage devices (e.g., solid state drives (SSDs) 150A, 150B, 150C, through 150Z of storage server 101). Additionally, a virtual drive 180A-X may map a logical storage address space to physical storage address spaces of storage devices on multiple different storage servers.

Figure 2:
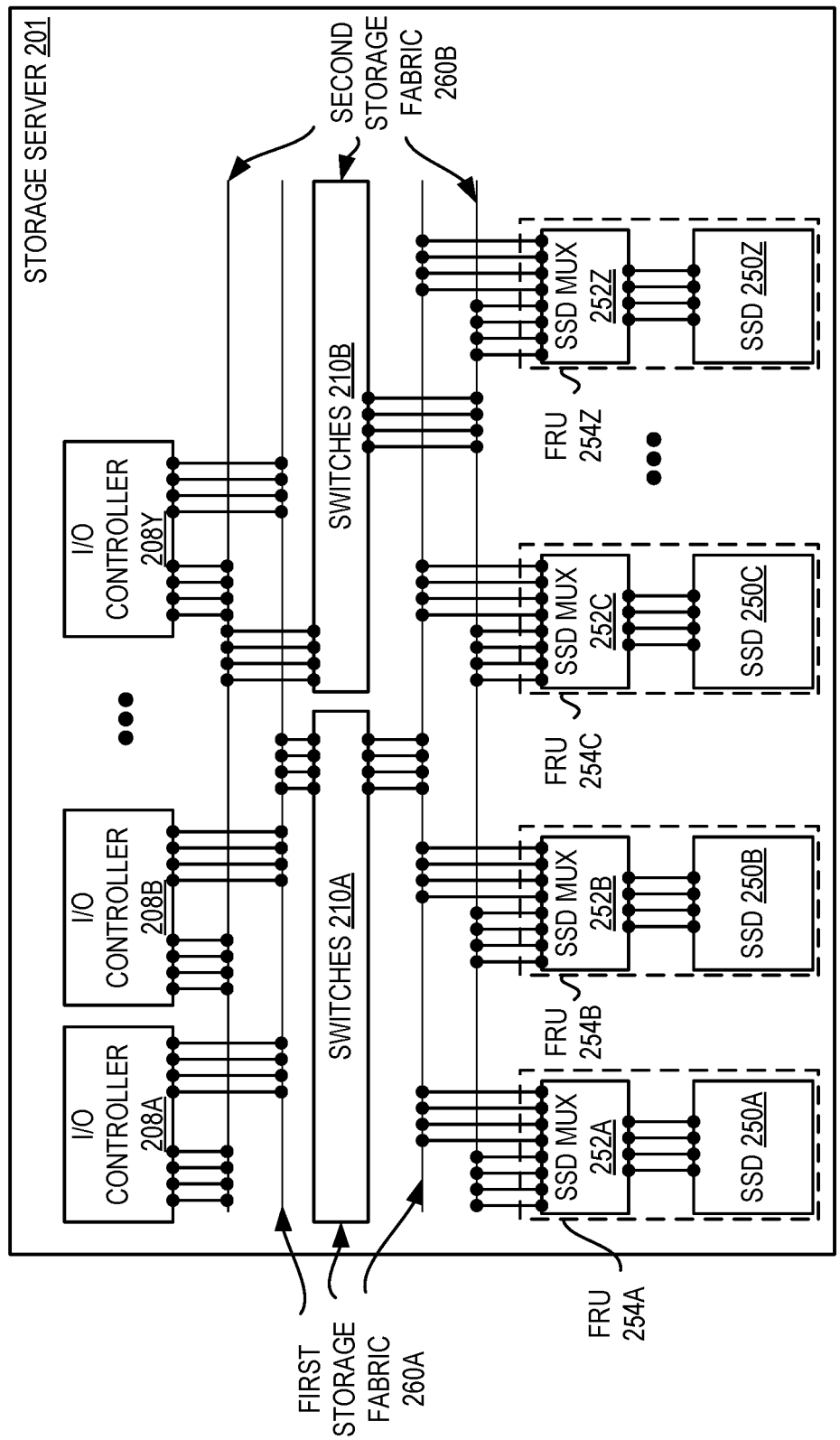
FIG. 2 is a block diagram of one embodiment of a storage server.

FIG. 2 is a block diagram of one embodiment of a storage server 201. In one embodiment, storage server 201 corresponds to storage server 101 of FIG. 1. Storage server 201 includes multiple I/O controllers 208A, 208B through 208N and a management controller 215 that are each connected to multiple different transport fabrics. In one embodiment, storage server 201 includes a first transport fabric 260A and a second transport fabric 260B. In alternative embodiments, storage server may include more than two transport fabrics. Each transport fabric 260A-B may include its own connectors, ports, hardware (e.g., switches), and so on that are separate and distinct from those of other transport fabrics. For example, first transport fabric 260A includes a first switch 210A (which may include multiple switches) and second transport fabric 260B includes a second switch 210B (which may include multiple switches).

Storage server 201 additionally includes multiple field replaceable units (FRUs) 254A, 254B, 254C, through 254Z, each of which may be plugged into a port in, for example, a backplane of the storage server 201. Each FRU 254A-Z may include an SSD 250A, 250B, 250C, through 250Z optionally coupled to an SSD multiplexer 252A, 252B, 252C, through 252Z. Each FRU 254A-Z may additionally include a drive carrier assembly (not shown) to which the SSD multiplexer 252A-Z and/or SSD 250A-Z may be mounted. Each FRU 254A-Z may function as a single unit that can be plugged into and unplugged from the storage server 201.

Each SSD 250A-Z may include a single physical port. In one embodiment, the port on the SSD 250A-Z is a SSD form factor (SFF) port with a male connector (e.g., with multiple pins). In one embodiment, the port on the SSD 150A-Z is an SFF-8639 PCIe port (also referred to as a U.2 port). PCIe is a high-speed serial computer expansion bus used to couple peripheral devices such as SSDs to a computing device. PCIe uses a point-to-point topology, with separate serial links connecting every device to a root complex (e.g., via a transport fabric). The PCIe link between two devices (e.g., between an SSD and an I/O controller) can consist of between one and thirty two lanes. Each lane is composed of two differential signaling pairs in which one pair is for sending data and the other pair is for receiving data. Accordingly, each lane includes four wires or signal traces that are used for a full-duplex byte stream. In one embodiment, each lane has an input/output capacity of 8 Gigabits per second. Alternatively, each lane may have an input/output capacity of up to 32 Gigabits per second. In a multi-lane link, packet data is striped across lanes, and peak data throughput scales with the number of lanes used. In one embodiment, the single physical port in each SSD 250A-Z is a 4 lane PCIe port (referred to as an x4 PCIe port). Alternatively, the physical port may be a 2 lane (x2) port, an 8 lane (x8) port, a 16 lane (x16) port, and so on.

Each SSD multiplexer 252A-Z includes two ports. In one embodiment, a first port of the SSD multiplexer 252A-Z is a same type of port as the port in the SSD 250A-Z. For example, if the SSD 250A-Z includes an x4 PCIe port with a male connector, then each SSD multiplexer 252A-Z may include an x4 PCIe port with a female connector that the port in the SSD 250A-Z plugs into (e.g., a U.2 port). A second port of the SSD multiplexer 252A-Z may have at least twice the number of lanes of the first port. In one embodiment, the second port has a number of lanes that is a multiple of the first port. For example, if the first port is an x4 PCIe port, then the second port may be an ×8, ×12 (e.g., an aggregate of three ×4 ports), ×16, etc. PCIe port. In the illustrated embodiment, the first port is an ×4 port and the second port is an ×8 port. In one embodiment, the second port is a mini PCIe port. In one embodiment, the second port is a PCIe port (or mini PCIe port) having male connectors. Thus, the second port may plug into a PCIe slot on the backplane of storage server 201.

In an alternative embodiment, multiple separate physical ports may be used instead of a single second port. Each of the physical ports may have a number of lanes equal to the number of lanes in the SSD 250A-Z. For example, the SSD multiplexer 252A-C may include a first physical port that couples to the SSD 250A-Z, a second physical port that couples to the first transport fabric 260A, and a third physical port that couples to the second transport fabric 260B. In one embodiment, the second and third ports are each U.2 ports or SSD form factor (SFF) ports. Alternatively, the second and third ports may each be standard PCIe male connectors used by PCIe cards.

In one embodiment, a first portion of the second port of the SSD multiplexers 252A-Z may couple to first transport fabric 260A and a second portion of the second port may couple to second transport fabric 260B. Similarly, I/O controllers 208A-Y are coupled to both the first transport fabric 260A and second transport fabric 260B. In one embodiment, a first subset of the lanes in the second port constitutes a first logical serial port and is usable to form a multi-lane link to first transport fabric 260A and a second subset of the lanes in the second port constitutes a second logical serial port and is usable to form a multi-lane link to second transport fabric 260B. The first logical serial port and second logical serial port may each have the same number of lanes as the physical port of the SSD 250A-Z. Accordingly, each logical serial port may provide full bandwidth to the SSD 250A-Z. Though two transport fabrics 260A-B are shown, storage server 201 may include more than two transport fabrics, and the SSD multiplexers 252A-Z may have full bandwidth connections to each of the transport fabrics.

One or more management controller may determine which transport fabric 260A, 260B to make active for specific 10 controllers 208A-Y and/or SSDs 250A-Z. Each SSD multiplexer 252A-Z then couples the logical serial port connected to the active transport fabric to the SSD 250A-Z. At any time a management controller may determine to make a different transport fabric active for an SSD and/or IO controller, and may send a message notifying the SSD multiplexer of the SSD to switch to that transport fabric.

Figure 3:
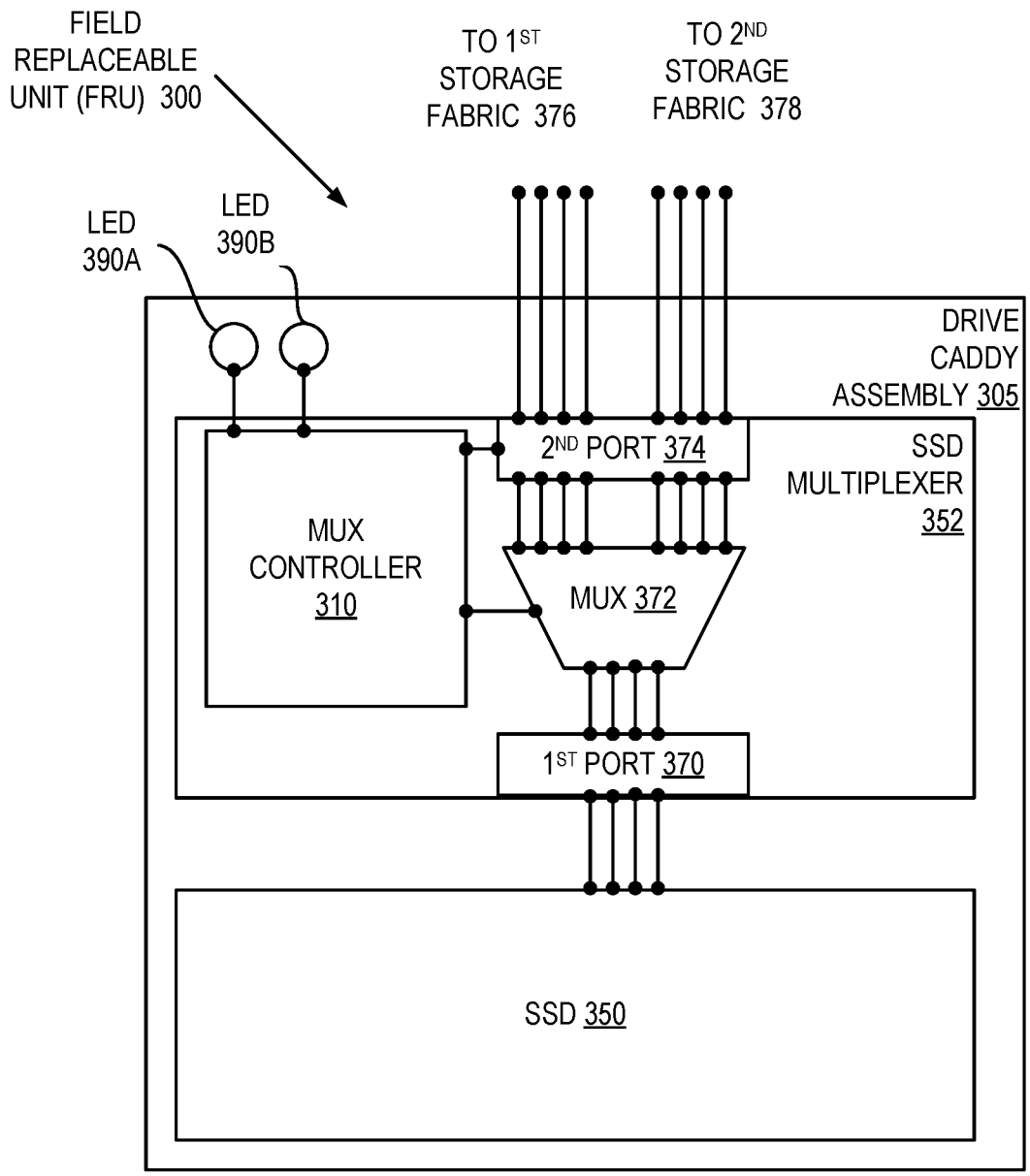
FIG. 3 is a block diagram of one embodiment of a field replaceable unit.

FIG. 3 is a block diagram of one embodiment of a field replaceable unit (FRU) 300. The FRU 300 may correspond to any of the FRUs 154A-Z of FIG. 1 and/or FRUs 254A-Z of FIG. 2. FRU 300 includes an SSD 350 coupled to (e.g., plugged into) an SSD multiplexer 352. The FRU 300 additionally includes a drive caddy assembly 305 that the SSD 350 and SSD multiplexer 352 are mounted to, as discussed in greater detail below. In one embodiment, SSD 350 and SSD multiplexer 352 are coupled to the drive caddy assembly 305 via one or more screws. Alternatively, the SSD 350 and/or SSD multiplexer 352 may be friction mounted to the drive caddy assembly 305. The FRU 300 may have an overall length that is slightly longer than the length of a standard SSD, but may have a height and width that are approximately the same as the height and width of the SSD. The entire FRU 300 may be plugged into a chassis in the same manner that an SSD is typically plugged into a chassis of a storage server.

The SSD multiplexer 352 may be a printed circuit board (PCB) having multiple chips thereon (e.g., a multiplexer 372 chip, a multiplexer controller 310 chip (which may be a 1-wire chip), and so on). In one embodiment, the SSD multiplexer 352 is a PCIe card that can be plugged into a standard PCIe slot (e.g., an ×8 PCIe slot, an ×16 PCIe slot, etc.) in the backplane of a storage server or other computing device. As shown, the SSD multiplexer 352 includes a first port 370 that couples the SSD multiplexer 352 to SSD 350. The SSD multiplexer 352 additionally includes a second port 374 that couples the SSD multiplexer 352 to a first transport fabric 376 and to a second transport fabric 378. Alternatively, the SSD multiplexer 352 may include a second physical port that connects to first transport fabric 376 and a third physical port that connects to second transport fabric 378. The first port 370 may be a PCIe port with a first number of lanes (e.g., an ×4 PCIe port) and second port 374 may be a PCIe port having at least twice the number of lanes of the first port 370 (e.g., may be an ×8 PCIe port). SSD multiplexer 352 additionally includes a multiplexer 372 interposed between the first port 370 and the second port 374. The multiplexer 372 may connect the first port 370 either to a first portion of the second port 374 that is arranged as a first logical port or a second portion of the second port 374 that is arranged as a second logical port. Thus, the SSD multiplexer 352 may provide multiple non-intervening paths via redundant access ports to the SSD 350, each of which provide the best performance possible for the SSD 350.

SSD multiplexer 352 includes a multiplexer controller 310 that controls the multiplexer 372. Multiplexer controller 310 may include a processing device such as a system on a chip (SoC), field programmable gate array (FPGA), an application specific integrated circuit (ASIC), a digital signal processor (DSP), a network processor, a complex instruction set computing (CISC) microprocessor, a reduced instruction set computing (RISC) microprocessor, a very long instruction word (VLIW) microprocessor, or the like. The processing device may be configured to execute processing logic for performing operations discussed herein. The multiplexer controller 310 may additionally include a non-volatile memory to store information such as a serial number, power consumption needs of the SSD multiplexer and/or an attached SSD, and so on.

In one embodiment, the SSD multiplexer 352 includes multiple light emitters or light sources (e.g., light emitting diodes (LEDs)). Multiplexer controller 310 may cause a first LED 390A to emit light when the SSD multiplexer 352 is powered on. A second LED 390B may indicate active reads and/or writes. For example, multiplexer controller 310 may cause the second LED 390B to blink when reads or writes are being performed on SSD 350. In one embodiment, drive caddy assembly 305 includes one or more light pipe and holes that cause the LEDs 390A-B to be visible when the FRU 300 is plugged into a chassis of a storage server.

FIGS. 4A-D illustrate various views of a plastic drive caddy assembly 400, in accordance with one embodiment of the present disclosure. The plastic drive caddy assembly 400 may have an SSD (not shown) and/or PCB (e.g., an SSD multiplexer) 438 mounted thereto, and the plastic drive caddy assembly 400 and mounted SSD and/or PCB 438 may together form an FRU.

Drive caddy assembly 400 includes plastic frame 405 which may be a rigid body that is used to couple other components together to form an FRU. Plastic frame 405 may be a single solid plastic body. The plastic frame 405 may include one or more cross beams 425 that both support SSD 450 and that increase a rigidity of the plastic frame 405.

Plastic frame 405 may include multiple holes or indentations 430 that may be configured to line up with screw holes in SSD 450. Additionally, or alternatively, one or more holes or indentations 430 may be replaced by bumps or protrusions that are configured to line up with screw holes in SSD 450. This may enable the SSD 450 to be secured to the drive caddy assembly 450 using fewer screws or using no screws. Plastic frame 405 may additionally include holes (e.g., screw holes) 435 that are configured to line up with holes (e.g., screw holes) of PCB 438. In one embodiment, holes 435 are threaded holes.

The plastic frame 405 may have been manufactured using injection molding or by three-dimensional (3D) printing. The plastic frame 405 may include a plastic faceplate 410 attached to a front of the plastic frame 405, a light pipe 420 attached to a side of the plastic frame 405, and an SSD 450 attached to the plastic frame 405 behind the plastic faceplate 410. Additionally, the plastic frame 405 may include a PCB 438 attached to the plastic frame 405. The plastic frame 405 may enable an SSD 450 and PCB 438 to be part of a single FRU.

The PCB 438 includes a first port 440 that couples to the SSD 450 and a second port 445 that is to couple to one or more transport fabric of a storage server, such as storage server 101. First port 440 may be a first serial port connected to the PCB 438, and may have a first number of lanes usable to form a first multi-lane link to the SSD 450. Second port 445 may be a second serial port connected to the PCB 438, and may have a second number of lanes usable to form a second multi-lane link to at least one of a first transport fabric of the storage server or a second transport fabric of the storage server. In embodiments, the PCB 438 corresponds to an SSD multiplexer 252A-Z of FIG. 2 and/or SSD multiplexer 352 of FIG. 3.

Light pipe 420 is connected to one side of the plastic frame 405. Light pipe 420 may be a single solid plastic body. The light pipe 420 may have been manufactured using injection molding or by three-dimensional (3D) printing. In embodiments, the light pipe 420 is formed from a different type of plastic than the plastic frame 405 or plastic faceplate 410. In particular, the plastic frame 405 and plastic faceplate 410 may be manufactured from plastics that are opaque or non-transparent for visible light. In contrast, the plastic light pipe 420 may be manufactured from a plastic that is transparent (or at least partially transparent) for visible light. The PCB may include two light emitters (e.g., LEDs), and the light pipe may include a first light pipe portion that guides light from the first light emitter to a cutout or hole 442 in the plastic faceplate 410 and a second light pipe portion that guides light from the second light emitter to a cutout or hole 444 in the plastic faceplate 410. Alternatively, the cutouts or holes 442, 444 may be parts of the plastic frame. The cutouts or holes 442, 444 enable a user or technician to be able to see the status of the SSD 450 and/or PCB 438 by glancing at the plastic faceplate 410 when the drive caddy assembly 400 is installed in a storage server.

Plastic faceplate 410 attaches to a front of plastic frame 405. Plastic faceplate 410 may be a single solid plastic body. Plastic faceplate 410 may have been manufactured using injection molding or by three-dimensional (3D) printing.

Plastic faceplate 410 includes cutouts or holes 442, 444 that are configured to receive ends of light pipe 420. Plastic faceplate 410 may include symbols or labels formed near cutouts or holes 442, 444 that depict a meaning of light conveyed through cutouts or holes 442, 444.

Plastic faceplate 410 includes a plastic spring 415. Plastic spring 415 is configured to move along a spring axis 418 that is perpendicular to a longitudinal axis (illustrated as the Z axis) of the drive caddy assembly. In one embodiment, plastic spring 415 is a horizontal spring. The plastic spring 415 has a resting state (as shown), and is configured to compress from the resting state along the spring axis 418 without moving perpendicular to the spring axis 418 (e.g., without moving or with minimal movement in the Z axis or Y axis) during insertion of the drive caddy assembly 400 into a drive receptacle of a storage server. The plastic spring 415 is further configured to return to the resting state when the drive caddy assembly 400 is fully seated in the drive receptacle.

In one embodiment, as illustrated, the plastic spring 415 has a corrugated shape. A force may be exerted on the plastic spring 415 in a first direction along the spring axis 418 to compress the plastic spring 415 along the spring axis 418. The plastic spring 415, while compressed, exerts a force in an opposite second direction along the spring axis 418. Once a force that is compressing the plastic spring 415 in the first direction is removed, the force exerted by the plastic spring 415 in the second direction causes the plastic spring 415 to return to the resting state (also referred to as resting position). In embodiments, the plastic spring 415 includes a finger-receiving area 475 into which a user or technician can manually exert a force on the plastic spring 415 along the spring axis 418. Plastic faceplate 410 may also include one or more scallops at a location above at least a portion of the plastic spring that facilitate manual exertion of force on the plastic spring 415 by a user or technician. Plastic frame 405 may additionally include one or more scallops at a location beneath at least a portion of the plastic spring that facilitate manual exertion of force on the plastic spring 515 by a user or technician.

In one embodiment, the plastic spring 415 includes a plastic tab 422 extending from a side of the plastic spring 415. In one embodiment, the plastic tab 422 is configured to engage with the drive receptacle of the storage server in a manner that translates a force on the drive caddy assembly 400 along the longitudinal axis of the drive caddy assembly (e.g., along the Z axis) applied during insertion of the drive caddy assembly 400 into the drive receptacle into a force on the plastic spring 415 along the spring axis 418. In one embodiment, plastic tab 422 is an angled locking tab. In one embodiment, the plastic tab 422 includes an angled portion (e.g., at an angle of about 45 degrees or about 30-60 degrees) to the longitudinal axis and/or to the spring axis 418. As the angled portion of the plastic tab 422 engages with a portion of the drive receptacle, a force exerted by a user or technician along the longitudinal axis is exerted on the plastic tab 422. The angled portion of the plastic tab 422, by the nature of its geometry, translates the force along the longitudinal axis of the drive caddy assembly 400 into a force along the spring axis 418. This force along the spring axis 418 compresses the plastic spring 415. Once the drive caddy assembly 400 is fully seated in the drive receptacle, the plastic tab 422 reaches a slot or cutout in a region of the drive receptacle, and thus a force along the spring axis 418 that was being exerted is removed. This causes the plastic spring 415 to return to its resting state. The plastic tab 422 extends into the slot or cutout in the region of the drive receptacle while the drive caddy assembly 400 is fully seated in the drive receptacle. This secures the drive caddy assembly 400 to the drive receptacle.

In embodiments, the configuration of the plastic tab 42 and a receiving area for the plastic tab 422 in the storage server (e.g., in the drive receptacle of the storage server) prevents the drive caddy assembly from being only partially inserted into the drive receptacle. In particular, the plastic tab 422 and plastic spring 415 may not return to their resting state until the drive caddy assembly is fully inserted into the drive receptacle of the storage server.

As used herein, a drive receptacle may include a region of a drive tray and/or chassis that is configured to receive a drive caddy assembly. The drive receptacle may include a portion of a PCB or backplane with one or more ports that the drive caddy assembly plug into, a portion of a frame of the drive tray and/or chassis into which the drive caddy assembly fits, and/or a locking mechanism or other component that the plastic tab 422 engages with (e.g., including the slot or cutout into which the plastic tab 422 extends).

In order to limit the degrees of motion of the plastic spring 415, the plastic faceplate 410 and/or plastic frame 405 may include one or more motion-limiting features. For example, the plastic faceplate 410 and/or plastic frame 405 may include motion-limiting features that restrict the plastic spring 415 to motion only along the spring axis 418.

Figure 4A:
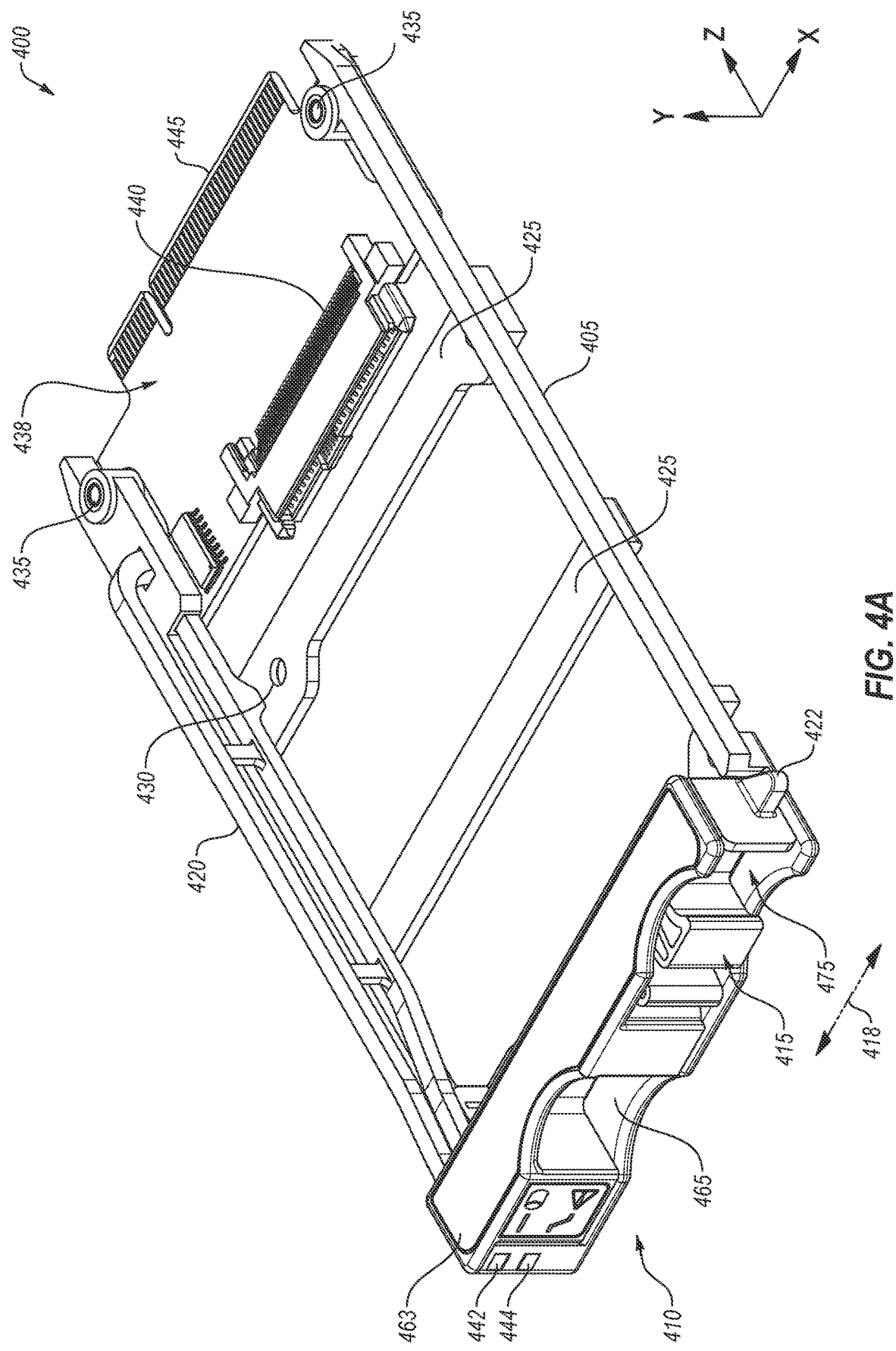
FIGS. 4A-D illustrate various views of a plastic drive caddy assembly, in accordance with one embodiment of the present disclosure.
Figure 4B:
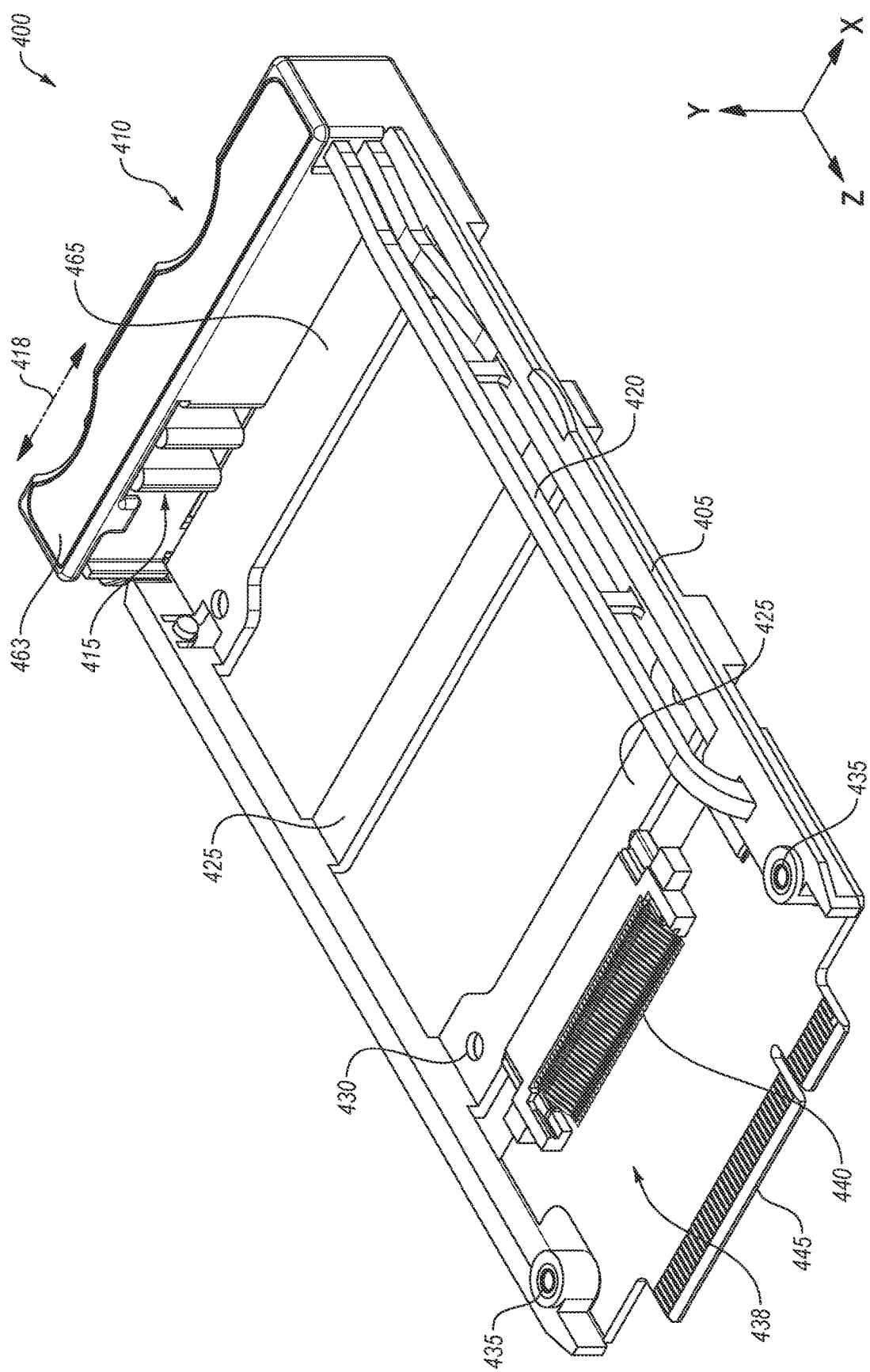
Figure 4C:
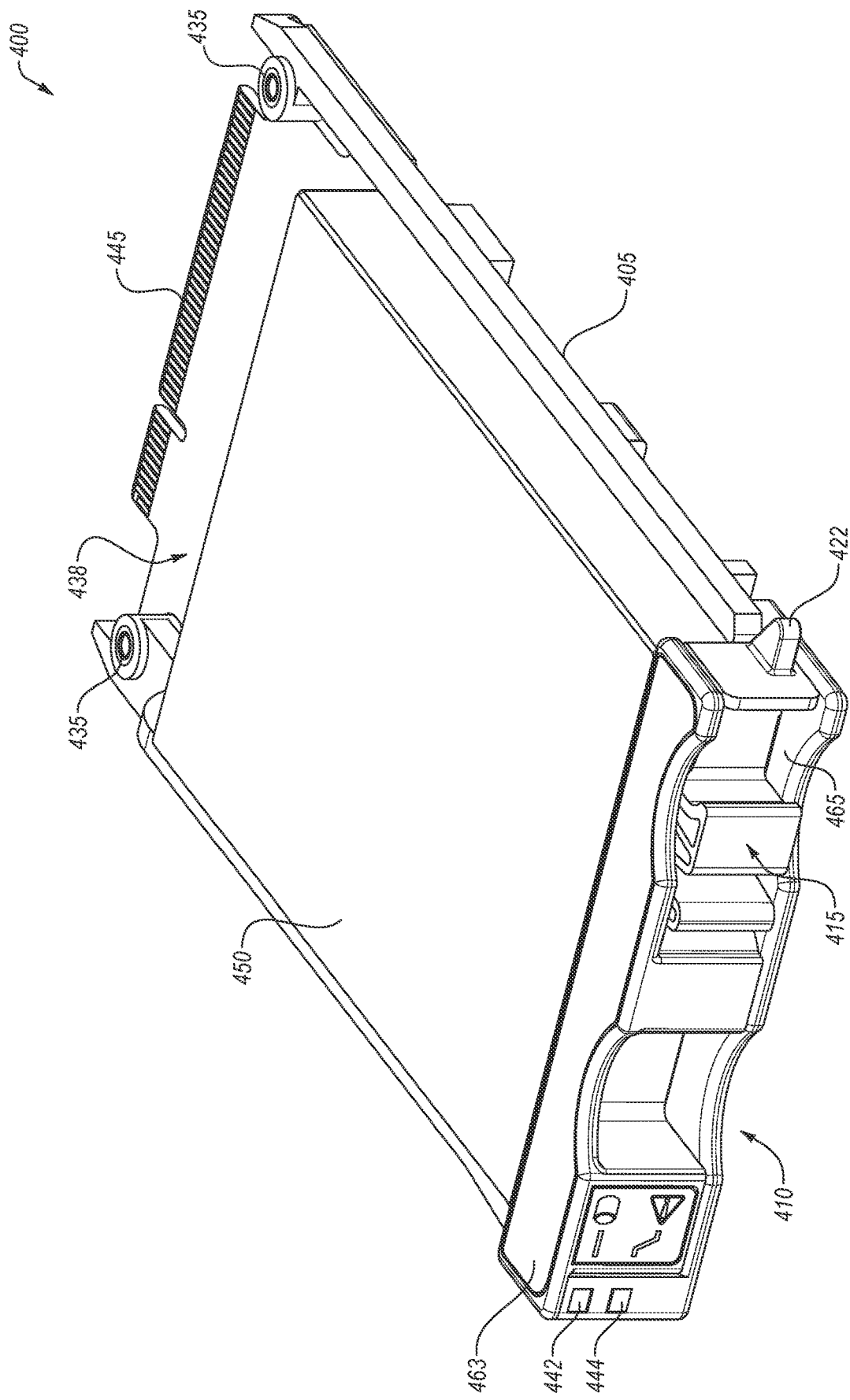
Figure 4D:
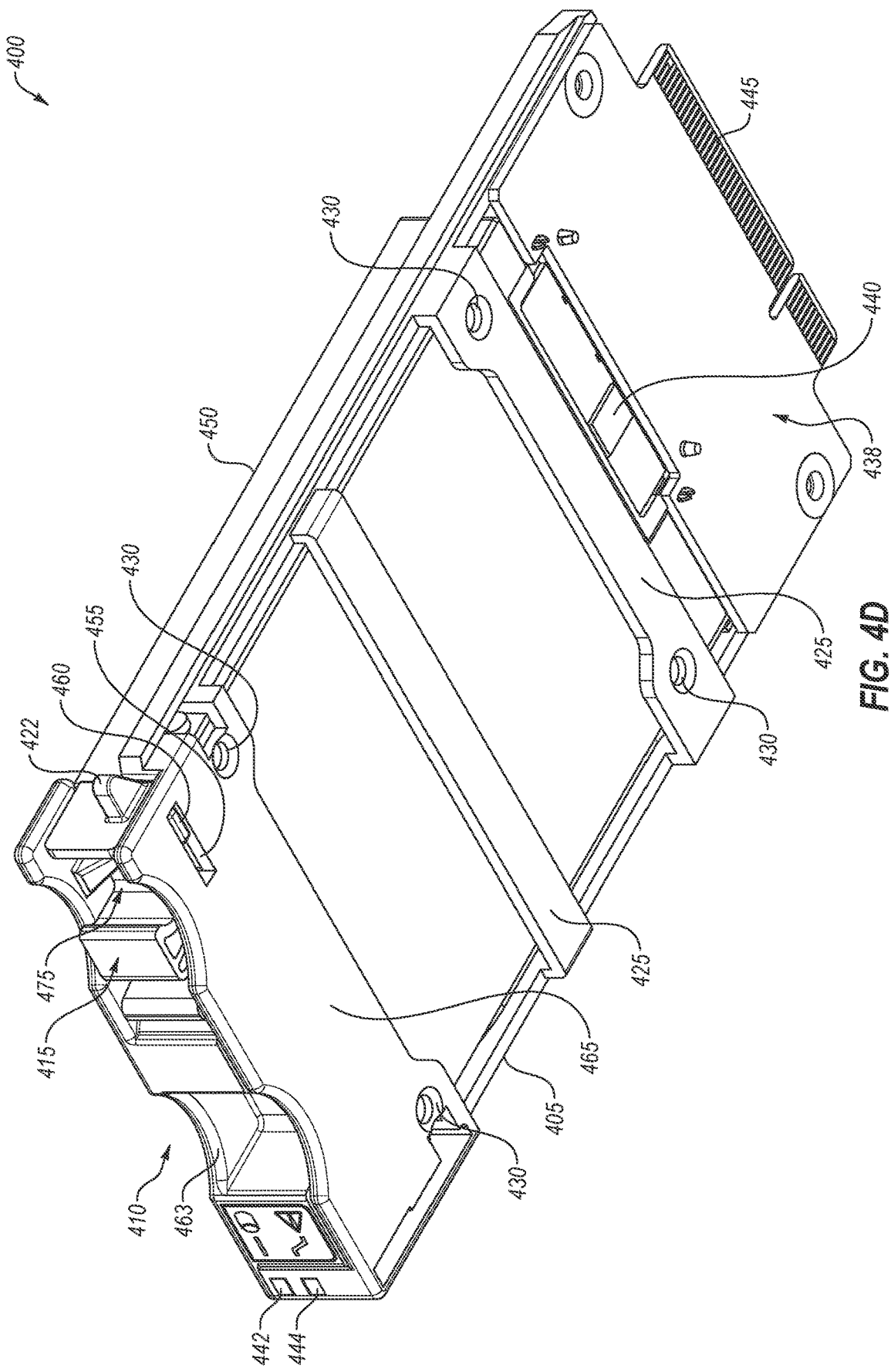

With reference to FIG. 4D, in one embodiment, plastic frame 405 includes a slot 455 that is parallel to spring axis 418. Plastic faceplate 410 includes a plastic tab 460 that extends from a bottom of the plastic spring 415 into the slot 455. The plastic tab 460 and the slot 455 together act as a motion limiter that limits motion of the plastic spring 415 along the longitudinal axis of the drive caddy assembly 400. The plastic tab 460 can slide within the slot 455 or cutout between two positions along the spring axis 418, but cannot move along the longitudinal axis.

In one embodiment, a first region 465 of the plastic frame 405 restricts motion of the plastic spring 415 in a first direction along an axis that is perpendicular to both the spring axis 418 and the longitudinal axis of the drive caddy assembly 400 (e.g., along the Y axis). Additionally, a second region 463 of the plastic faceplate 410 (or the plastic frame 405) restricts motion of the plastic spring 415 in a second direction along the axis that is perpendicular to both the spring axis 418 and the longitudinal axis, wherein the second direction is opposite the first direction.

Figure 4E:
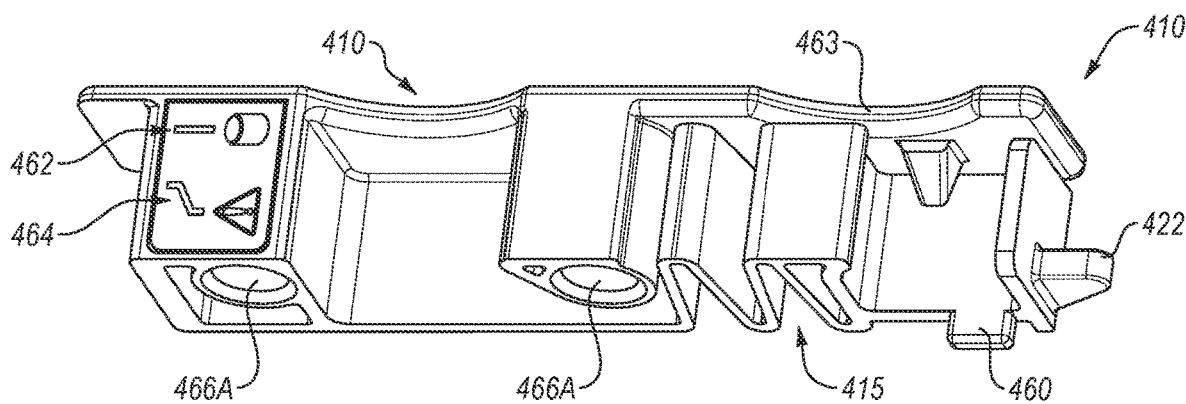
FIGS. 4E-G illustrate various views of a faceplate of a plastic drive caddy assembly, in accordance with one embodiment of the present disclosure.
Figure 4F:
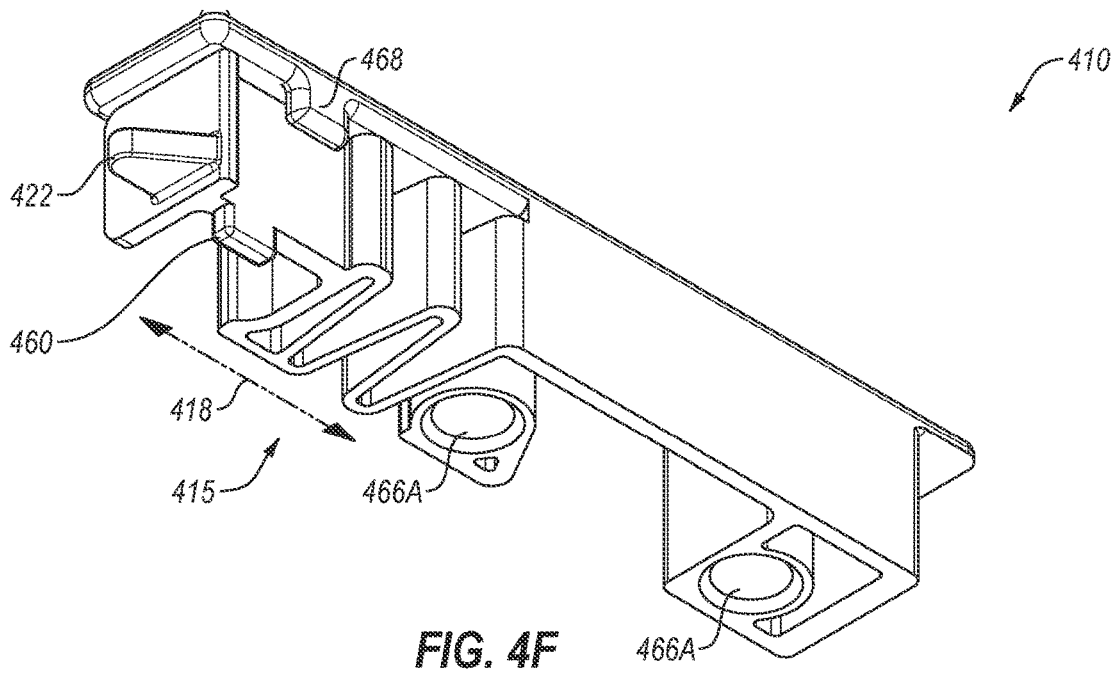
Figure 4G:
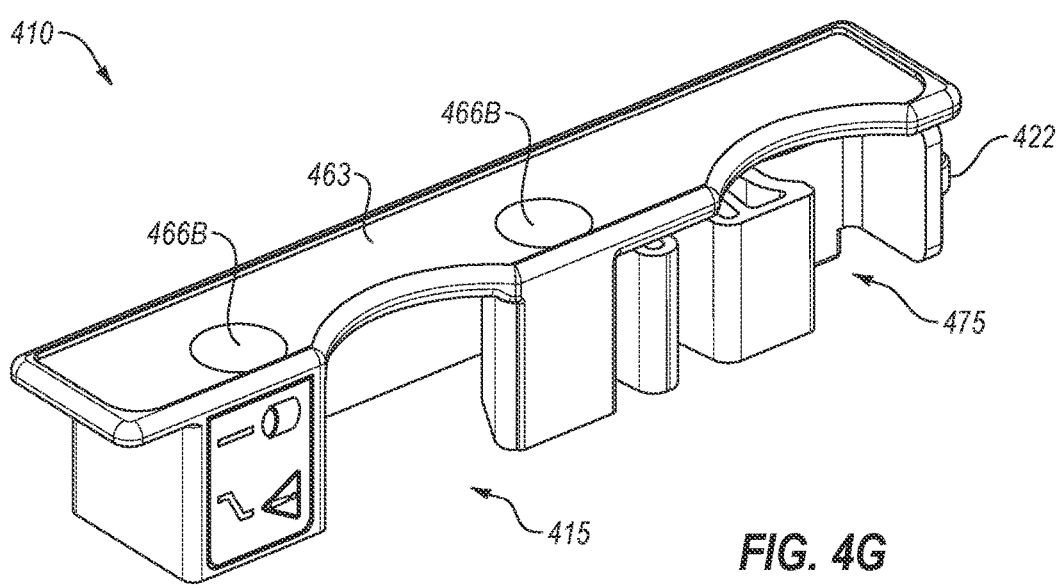
Figure 4H:
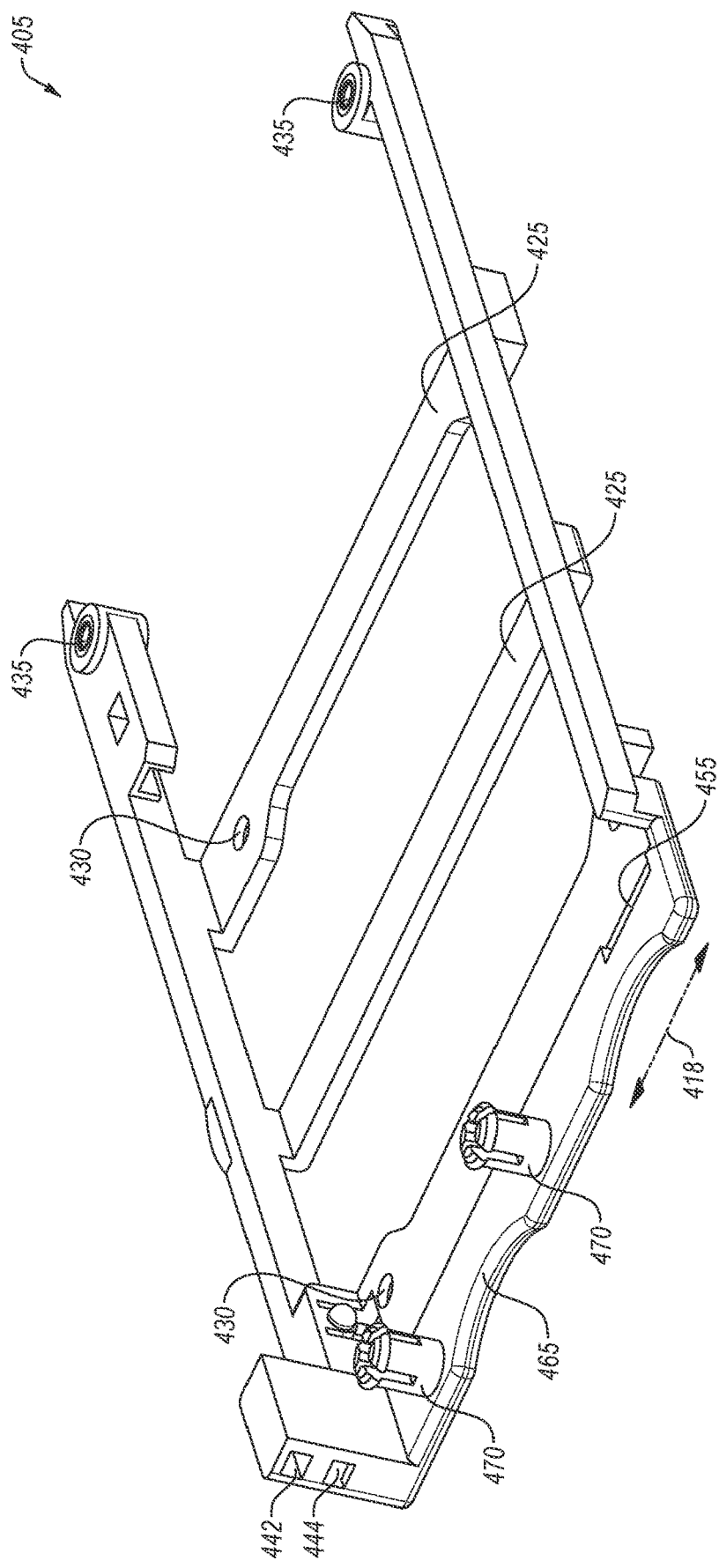
FIG. 4H illustrates a view of a plastic frame of a plastic drive caddy assembly, in accordance with one embodiment of the present disclosure.

FIGS. 4E-G illustrate various views of a plastic faceplate 410 of a plastic drive caddy assembly 400, in accordance with one embodiment of the present disclosure. FIG. 4H illustrates a view of a plastic frame 405 of a plastic drive caddy assembly 400, in accordance with one embodiment of the present disclosure.

Plastic faceplate 410 may be removable from plastic frame 405 in embodiments. In one embodiment, the plastic faceplate 410 includes one or more engagement features 466A-B (e.g., one or more female engagement features that engage with one or more engagement features 470 (e.g., one or more male engagement features) of the plastic frame 405, such as a through hole with a stepped diameter or a non-through hole with a stepped diameter. Engagement features 466A and 466B may be opposite ends of a through hole with a stepped diameter in an embodiment. Engagement features 470 may be cylinders of a first diameter with mushroom-shaped heads having a larger second diameter. The cylinders may include cutouts that enable the cylinders to compress radially towards a center of the cylinders when they are inserted into engagement features 466A of plastic faceplate 410. In one embodiment, engagement features 470 are lock-in tabs. Engagement features 466A-B may be holes (e.g., through holes and/or non-through holes) in plastic faceplate 410 configured to receive engagement features 470. Engagement features 466A may be first holes having a first diameter and engagement features 466B may be connected second holes having a larger second diameter. When plastic faceplate 410 is fully seated on plastic frame 405, the mushroom-shaped heads of engagement features 470 may extend into engagement features 466B, locking the plastic faceplate 410 to the plastic frame 405.

Figure 4I:
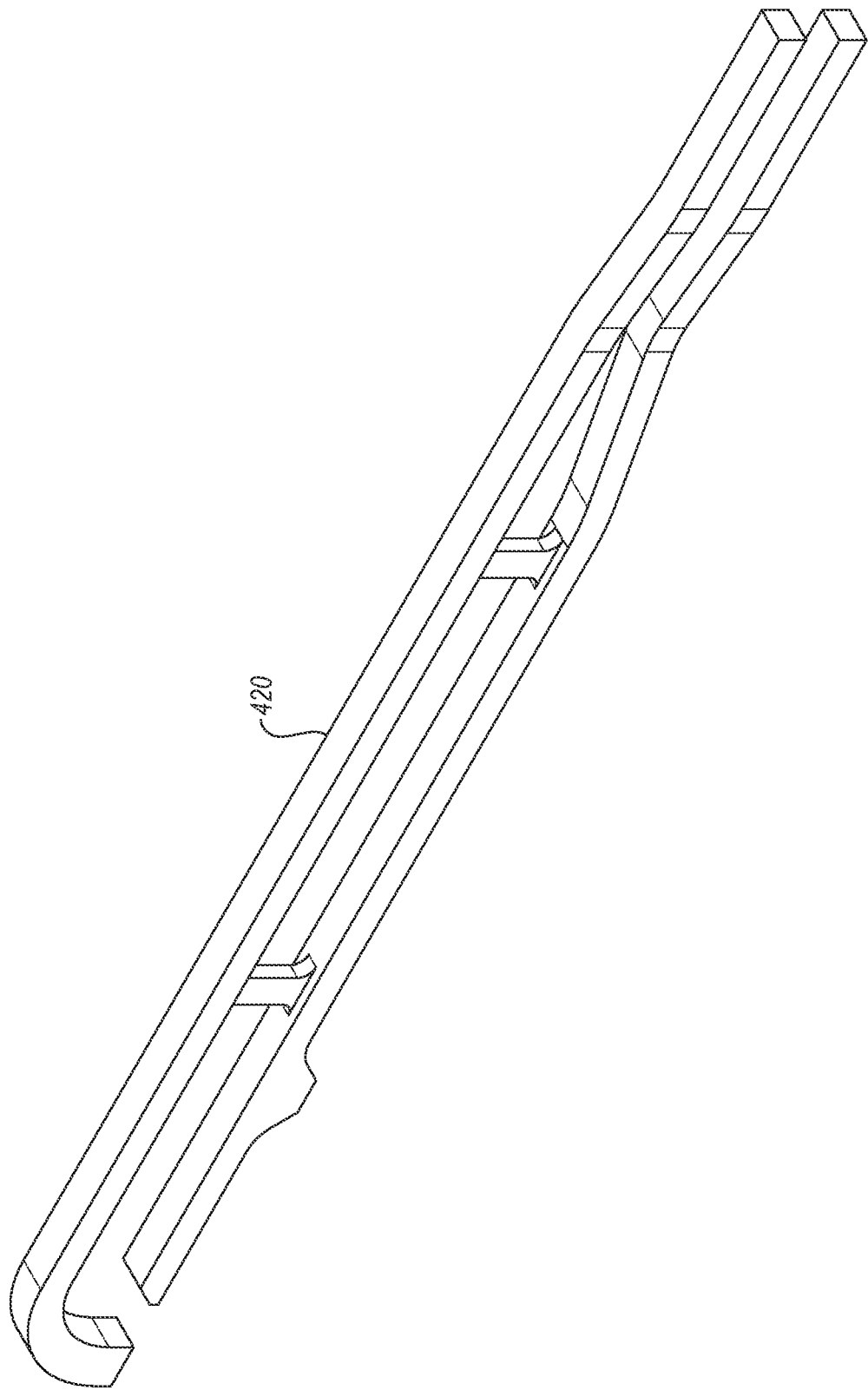
FIG. 4I illustrates a light pipe of a plastic drive caddy assembly, in accordance with one embodiment of the present disclosure.

FIG. 4I illustrates a plastic light pipe 420 of a plastic drive caddy assembly 400, in accordance with one embodiment of the present disclosure.

Figure 5A:
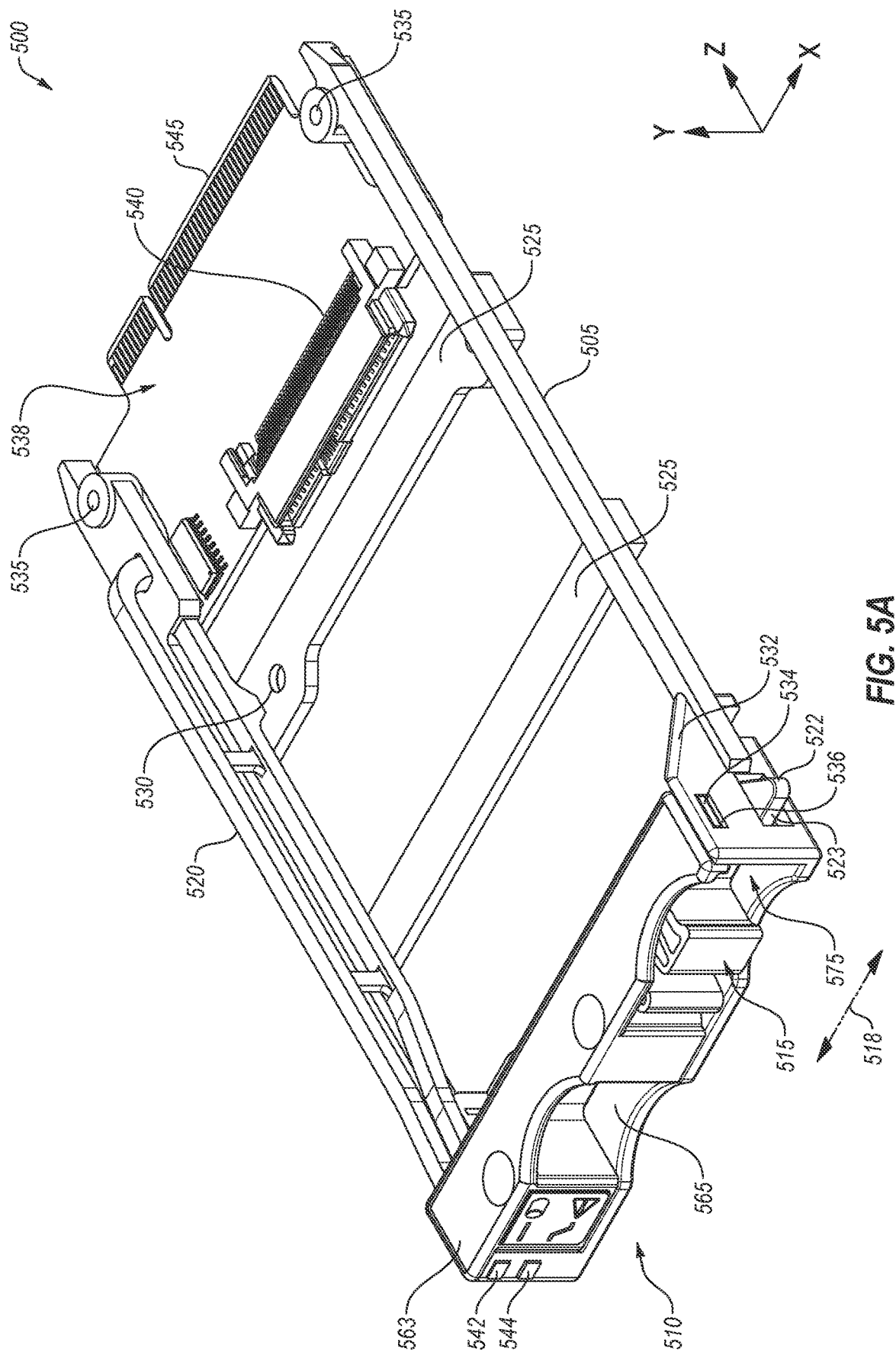
FIGS. 5A-B illustrate various views of a plastic drive caddy assembly, in accordance with one embodiment of the present disclosure.
Figure 5B:
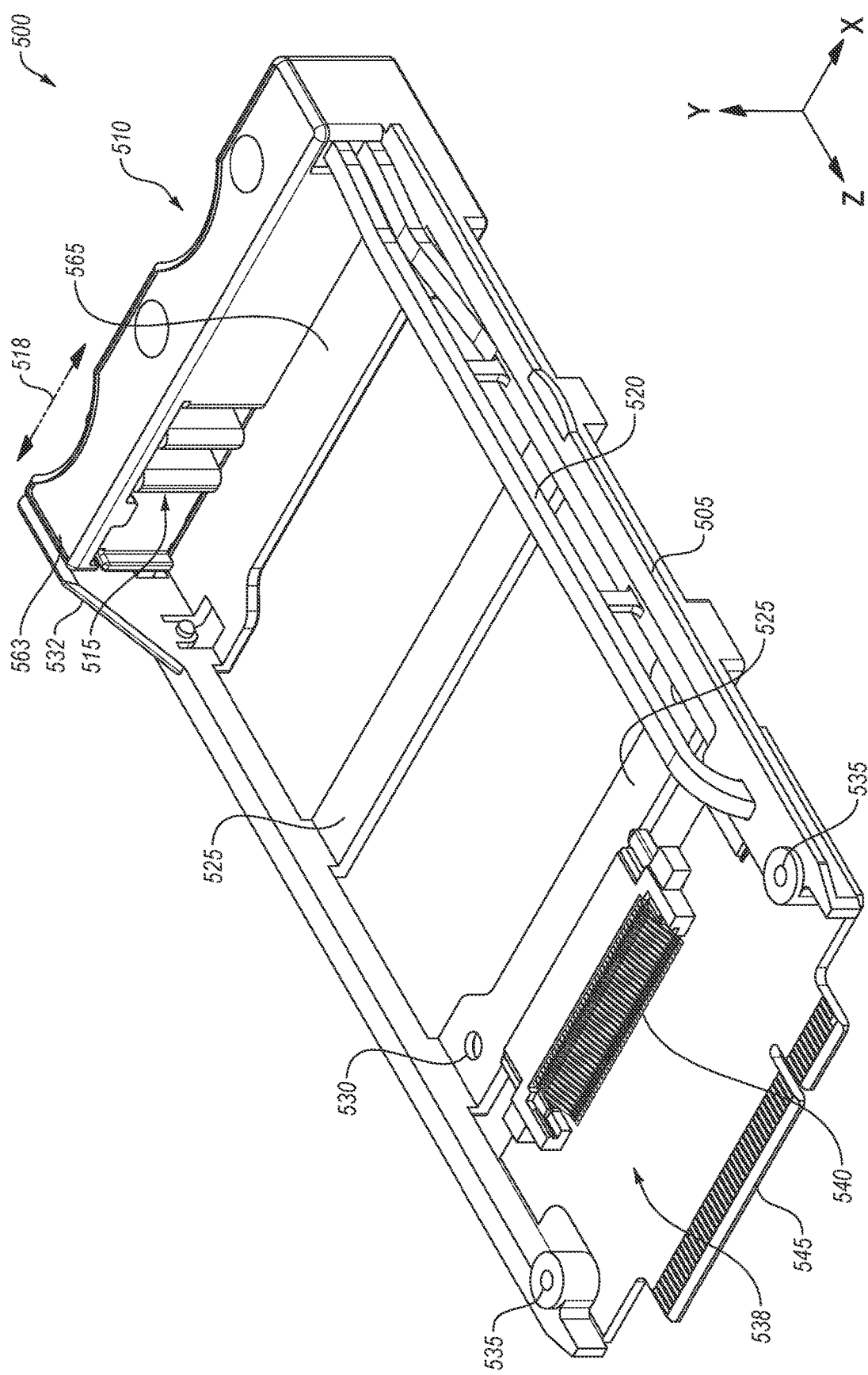

FIGS. 5A-B illustrate various views of a plastic drive caddy assembly 500, in accordance with one embodiment of the present disclosure. The plastic drive caddy assembly 500 may have an SSD (not shown) and/or PCB (e.g., an SSD multiplexer) 538 mounted thereto, and the plastic drive caddy assembly 500 and mounted SSD and/or PCB 538 may together form an FRU.

Drive caddy assembly 500 includes plastic frame 505 which may be a rigid body that is used to couple other components together to form an FRU. Plastic frame 505 may be a single solid plastic body. The plastic frame 505 may include one or more cross beams 525 that both support an SSD and that increase a rigidity of the plastic frame 505. Plastic frame 505 may include multiple holes or indentations 530 that may be configured to line up with screw holes in an SSD. Additionally, or alternatively, one or more holes or indentations 530 may be replaced by bumps or protrusions that are configured to line up with screw holes in an SSD. This may enable the SSD to be secured to the drive caddy assembly 500 using fewer screws or using no screws. Plastic frame 505 may additionally include holes (e.g., screw holes) 535 that are configured to line up with holes (e.g., screw holes) of PCB 538. In one embodiment, holes 535 are threaded holes.

The plastic frame 505 may have been manufactured using injection molding or by three-dimensional (3D) printing. The plastic frame 505 may include a plastic faceplate 510 attached to a front of the plastic frame 505, a light pipe 520 attached to a side of the plastic frame 505, and an SSD (not shown) attached to the plastic frame 505 behind the plastic faceplate 510. Additionally, the plastic frame 505 may include a PCB 538 attached to the plastic frame 505. The plastic frame 505 may enable an SSD and PCB 538 to be part of a single FRU.

The PCB 538 includes a first port 540 that couples to the SSD and a second port 545 that is to couple to a transport fabric of a storage server, such as storage server 101. First port 540 may be a first serial port connected to the PCB 538, and may have a first number of lanes usable to form a first multi-lane link to the SSD. Second port 545 may be a second serial port connected to the PCB 538, and may have a second number of lanes usable to form a second multi-lane link to at least one of a first transport fabric of the storage server or a second transport fabric of the storage server. In embodiments, the PCB 538 corresponds to an SSD multiplexer 252A-Z of FIG. 2 and/or SSD multiplexer 352 of FIG. 3.

Light pipe 520 is connected to one side of the plastic frame 505. Light pipe 520 may be a single solid plastic body. The light pipe 520 may have been manufactured using injection molding or by three-dimensional (3D) printing. In embodiments, the light pipe 520 is formed from a different type of plastic than the plastic frame 505 or plastic faceplate 510. In particular, the plastic frame 505 and plastic faceplate 510 may be manufactured from plastics that are opaque or non-transparent for visible light. In contrast, the plastic light pipe 520 may be manufactured from a plastic that is transparent (or at least partially transparent) for visible light. The PCB 538 may include two light emitters (e.g., LEDs), and the light pipe 520 may include a first light pipe portion that guides light from the first light emitter to a cutout or hole 542 in the plastic faceplate 510 and/or plastic frame 505 and a second light pipe portion that guides light from the second light emitter to a cutout or hole 544 in the plastic faceplate 510 and/or plastic frame 505. This enables a user or technician to be able to see the status of the SSD and/or PCB 538 by glancing at the plastic faceplate 510 when the drive caddy assembly 500 is installed in a storage server.

Plastic faceplate 510 attaches to a front of plastic frame 505. Plastic faceplate 510 may be a single solid plastic body. Plastic faceplate 510 may have been manufactured using injection molding or by three-dimensional (3D) printing.

Plastic faceplate 510 and/or plastic frame 505 includes cutouts or holes 542, 544 that are configured to receive ends of light pipe 520. Plastic faceplate 510 and/or plastic frame 505 may include symbols or labels formed near cutouts or holes 542, 544 that depict a meaning of light conveyed through cutouts or holes 542, 544.

Plastic faceplate 510 includes a plastic spring 515. Plastic spring 515 is configured to move along a spring axis 518 that is perpendicular to a longitudinal axis (illustrated as the Z axis) of the drive caddy assembly. The plastic spring 515 has a resting state (as shown), and is configured to compress from the resting state along the spring axis 518 without moving perpendicular to the spring axis 518 (e.g., without moving or with minimal movement in the Z axis or Y axis) during insertion of the drive caddy assembly 500 into a drive receptacle of a storage server. The plastic spring 515 is further configured to return to the resting state when the drive caddy assembly 500 is fully seated in the drive receptacle.

In one embodiment, as illustrated, the plastic spring 515 has a corrugated shape. A force may be exerted on the plastic spring 515 in a first direction along the spring axis 518 to compress the plastic spring 515 along the spring axis 518. The plastic spring 515, while compressed, exerts a force in an opposite second direction along the spring axis 518. Once a force that is compressing the plastic spring 515 in the first direction is removed, the force exerted by the plastic spring 515 in the second direction causes the plastic spring 515 to return to the resting state (also referred to as resting position). In embodiments, the plastic spring 515 includes a finger-receiving area 575 into which a user or technician can manually exert a force (e.g., using one or more fingers) on the plastic spring 515 along the spring axis 518. Plastic faceplate 510 may also include one or more scallops at a location above at least a portion of the plastic spring that facilitate manual exertion of force on the plastic spring 515 by a user or technician. Plastic frame 505 may additionally include one or more scallops at a location beneath at least a portion of the plastic spring that facilitate manual exertion of force on the plastic spring 515 by a user or technician.

In one embodiment, the plastic spring 515 includes a plastic tab 522 extending from a side of the plastic spring 515. In one embodiment, the plastic tab 522 is configured to engage with the drive receptacle of the storage server in a manner that translates a force on the drive caddy assembly 500 along the longitudinal axis of the drive caddy assembly (e.g., along the Z axis) applied during insertion of the drive caddy assembly 500 into the drive receptacle into a force on the plastic spring 515 along the spring axis 518. In one embodiment, the plastic tab 522 includes an angled portion (e.g., at an angle of about 45 degrees or about 30-60 degrees) to the longitudinal axis and/or to the spring axis 518. As the angled portion of the plastic tab 522 engages with a portion of the drive receptacle, a force exerted by a user or technician along the longitudinal axis is exerted on the plastic tab 522. The angled portion of the plastic tab 522, by the nature of its geometry, translates the force along the longitudinal axis of the drive caddy assembly 500 into a force along the spring axis 518. This force along the spring axis 518 compresses the plastic spring 515. Once the drive caddy assembly 500 is fully seated in the drive receptacle, the plastic tab 522 reaches a slot or cutout in a region of the drive receptacle, and thus a force along the spring axis 518 that was being exerted is removed. This causes the plastic spring 515 to return to its resting state. The plastic tab 522 extends into the slot or cutout in the region of the drive receptacle while the drive caddy assembly 500 is fully seated in the drive receptacle. This secures the drive caddy assembly 500 to the drive receptacle.

In order to limit the degrees of motion of the plastic spring 515, the plastic faceplate 510 and/or plastic frame 505 may include one or more motion-limiting features. For example, the plastic faceplate 510 and/or plastic frame 505 may include motion-limiting features that restrict the plastic spring 515 to motion only along the spring axis 518.

In one embodiment, plastic frame 505 includes a side wall 532 positioned on a side of the plastic faceplate 510. Side wall 532 includes a cutout or slot 536 that engages with a plastic tab 534 extending from a side of the plastic faceplate 510 to secure the plastic faceplate 510 to the plastic frame 505. In one embodiment, the side wall 532 further includes a cutout or slot 523 that is positioned and sized to receive the plastic tab 522 extending from the plastic spring 515. The plastic tab 522 and the slot 523 together act as a motion limiter that limits motion of the plastic spring 515 along the longitudinal axis of the drive caddy assembly.

In one embodiment, a first region 565 of the plastic frame 505 restricts motion of the plastic spring 515 in a first direction along an axis that is perpendicular to both the spring axis 518 and the longitudinal axis of the drive caddy assembly 500 (e.g., along the Y axis). Additionally, a second region 563 of the plastic faceplate 510 (or the plastic frame 505) restricts motion of the plastic spring 515 in a second direction along the axis that is perpendicular to both the spring axis 518 and the longitudinal axis, wherein the second direction is opposite the first direction.

Plastic faceplate 510 may be removable from plastic frame 505 in embodiments. In one embodiment, the plastic faceplate 510 includes one or more engagement features (not shown) (e.g., one or more female engagement features that engage with one or more engagement features (not shown) (e.g., one or more male engagement features) of the plastic frame 505. Engagement features of the plastic frame 505 may be cylinders of a first diameter with mushroom-shaped heads having a larger second diameter. The cylinders may include cutouts that enable the cylinders to compress radially towards a center of the cylinders when they are inserted into engagement features of plastic faceplate 510. Engagement features of plastic faceplate 510 may be holes in plastic faceplate 510 configured to receive engagement features of plastic frame 505. Engagement features of plastic faceplate 510 may include first holes extending from a bottom of plastic faceplate 510 having a first diameter and second holes extending from a top of plastic faceplate 510 and meeting the first holes, the second holes having a larger second diameter than the first diameter. When plastic faceplate 510 is fully seated on plastic frame 505, the mushroom-shaped heads of engagement features of the plastic frame 505 may extend into engagement features of the plastic faceplate 510, locking the plastic faceplate 510 to the plastic frame 505.

Figure 5C:
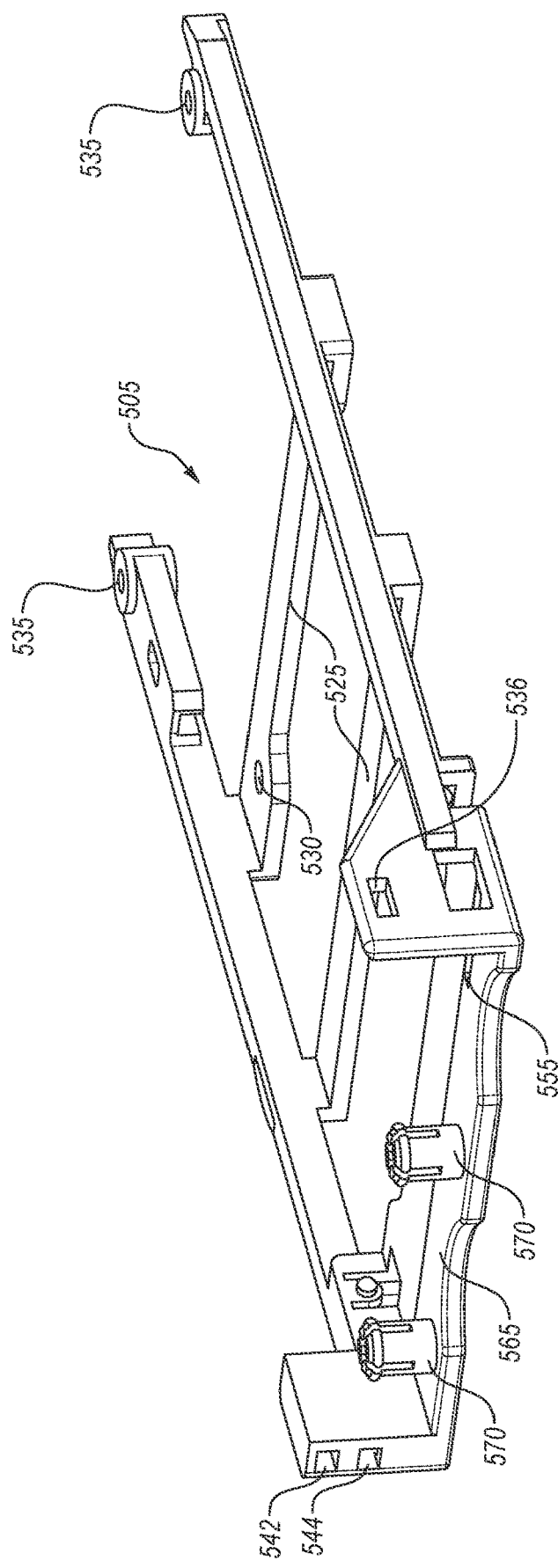
FIG. 5C illustrates a view of a plastic frame of a plastic drive caddy assembly, in accordance with one embodiment of the present disclosure.
Figure 5D:
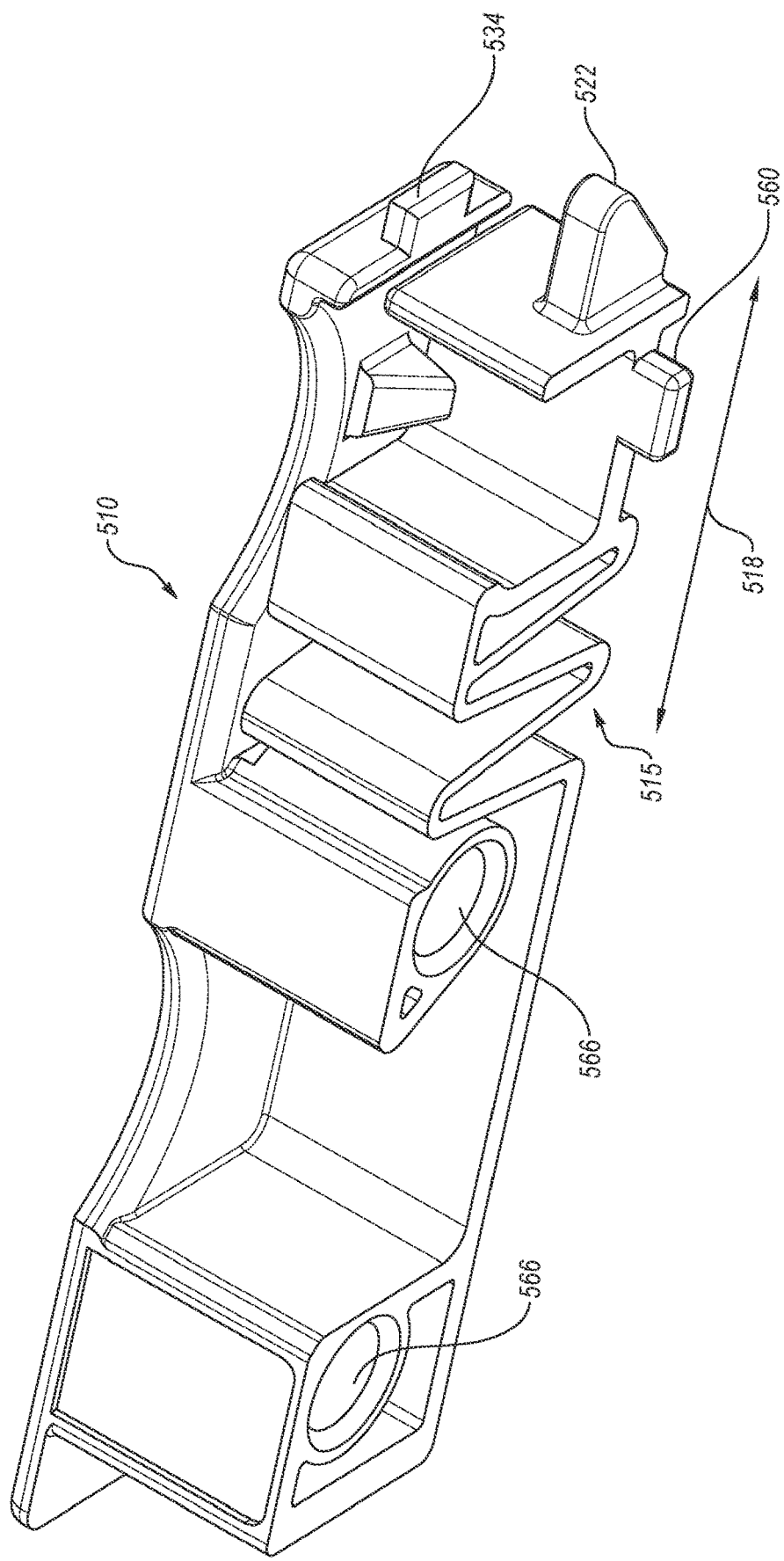
FIG. 5D illustrates a view of a faceplate of a plastic drive caddy assembly, in accordance with one embodiment of the present disclosure.

FIG. 5C illustrates a view of a plastic frame 505 of a plastic drive caddy assembly 500, in accordance with one embodiment of the present disclosure. FIG. 5D illustrates a view of a plastic faceplate 510 of a plastic drive caddy assembly 500, in accordance with one embodiment of the present disclosure.

Plastic faceplate 510 may be removable from plastic frame 505 in embodiments. In one embodiment, the plastic faceplate 510 includes one or more engagement features 566 (e.g., one or more female engagement features that engage with one or more engagement features 570 (e.g., one or more male engagement features) of the plastic frame 505, such as a through hole with a stepped diameter or a non-through hole with a stepped diameter. Engagement features 566 include a non-through hole or include a through hole with a stepped diameter in embodiments. Engagement features 570 may be cylinders of a first diameter with mushroom-shaped heads having a larger second diameter. The cylinders may include cutouts that enable the cylinders to compress radially towards a center of the cylinders when they are inserted into engagement features 566 of plastic faceplate 510. In one embodiment, engagement features 570 are lock-in tabs. Engagement features 566 may be holes (e.g., through holes and/or non-through holes) in plastic faceplate 510 configured to receive engagement features 570. When plastic faceplate 510 is fully seated on plastic frame 505, the mushroom-shaped heads of engagement features 570 may extend into a larger diameter region of engagement features 566, locking the plastic faceplate 510 to the plastic frame 505.

Figure 6A:
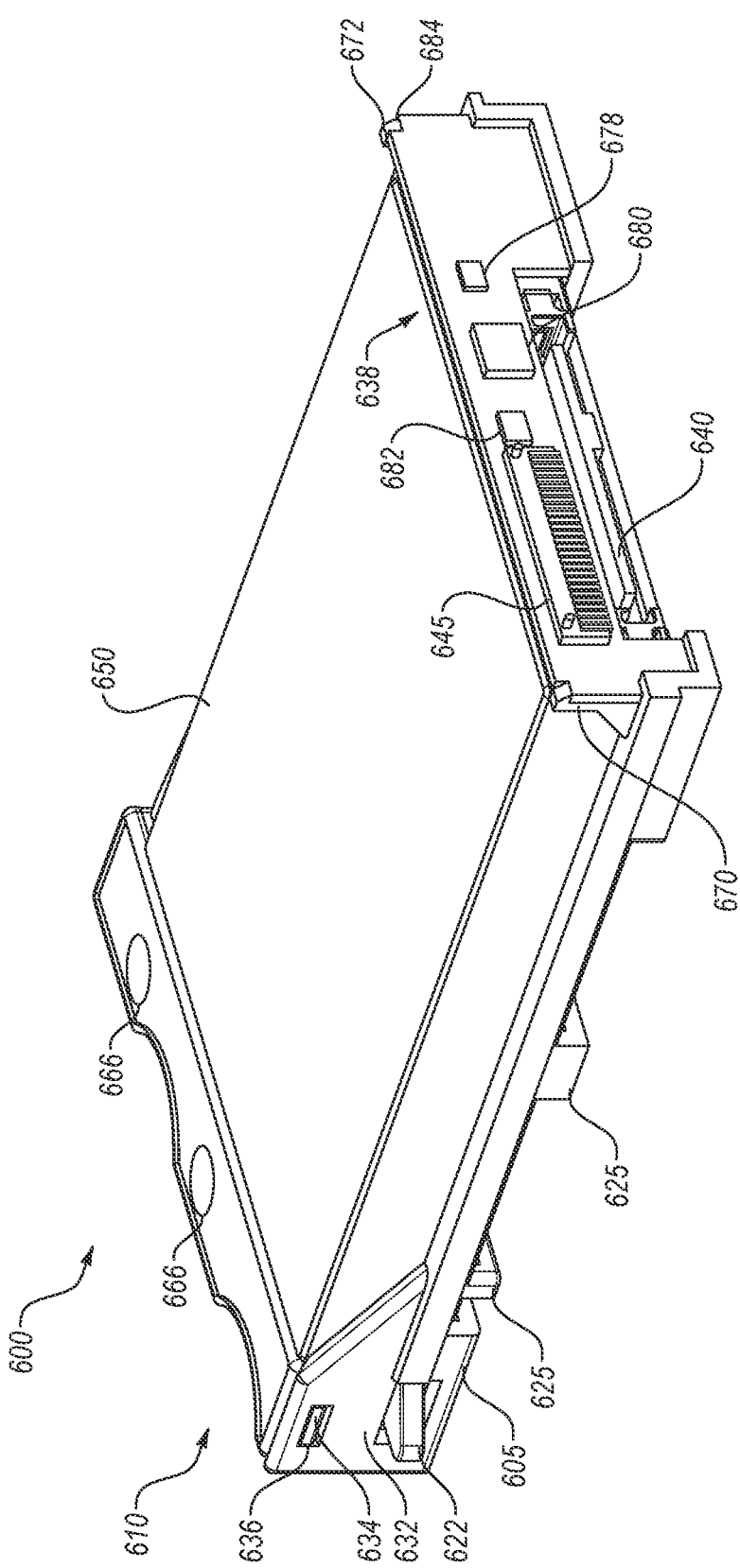
FIGS. 6A-C illustrate various views of a plastic drive caddy assembly, in accordance with one embodiment of the present disclosure.
Figure 6B:
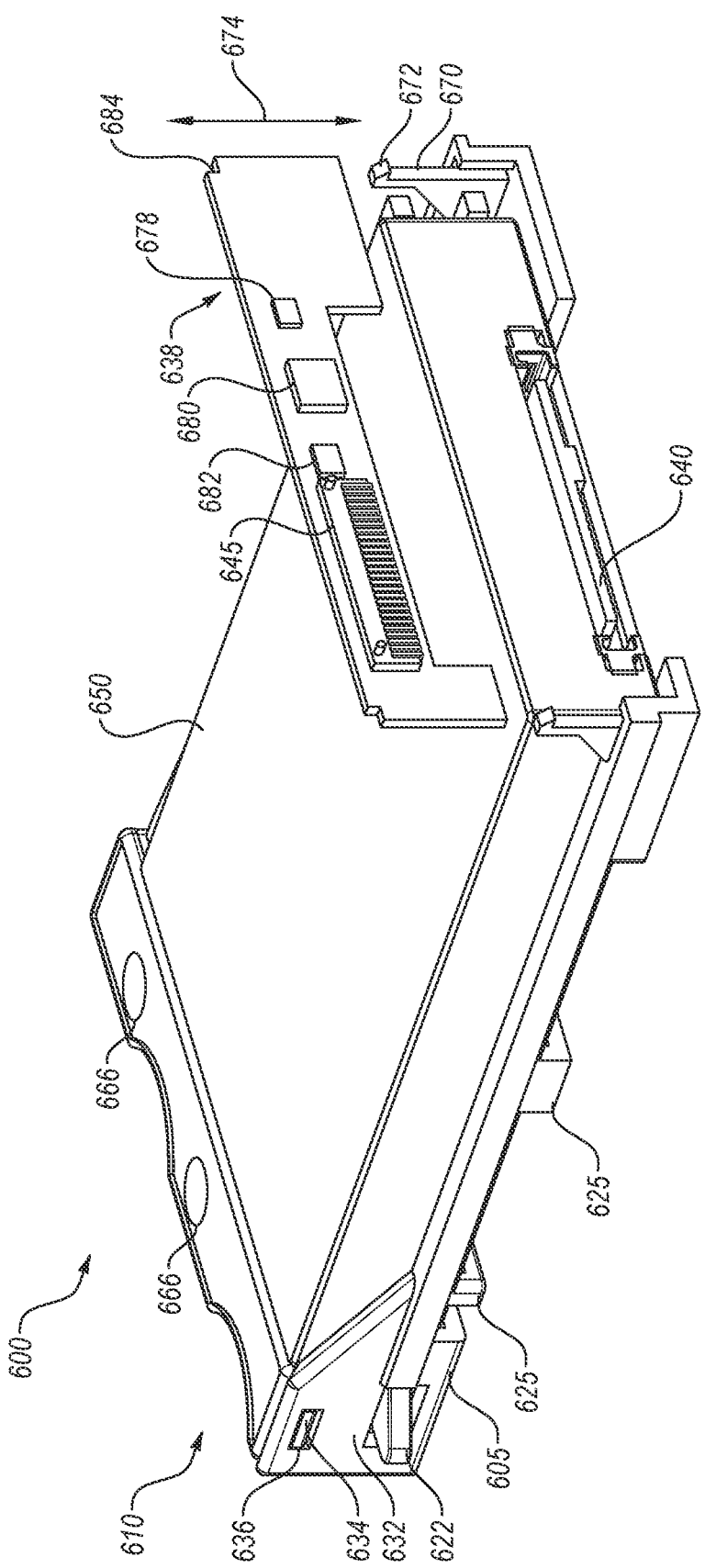
Figure 6C:
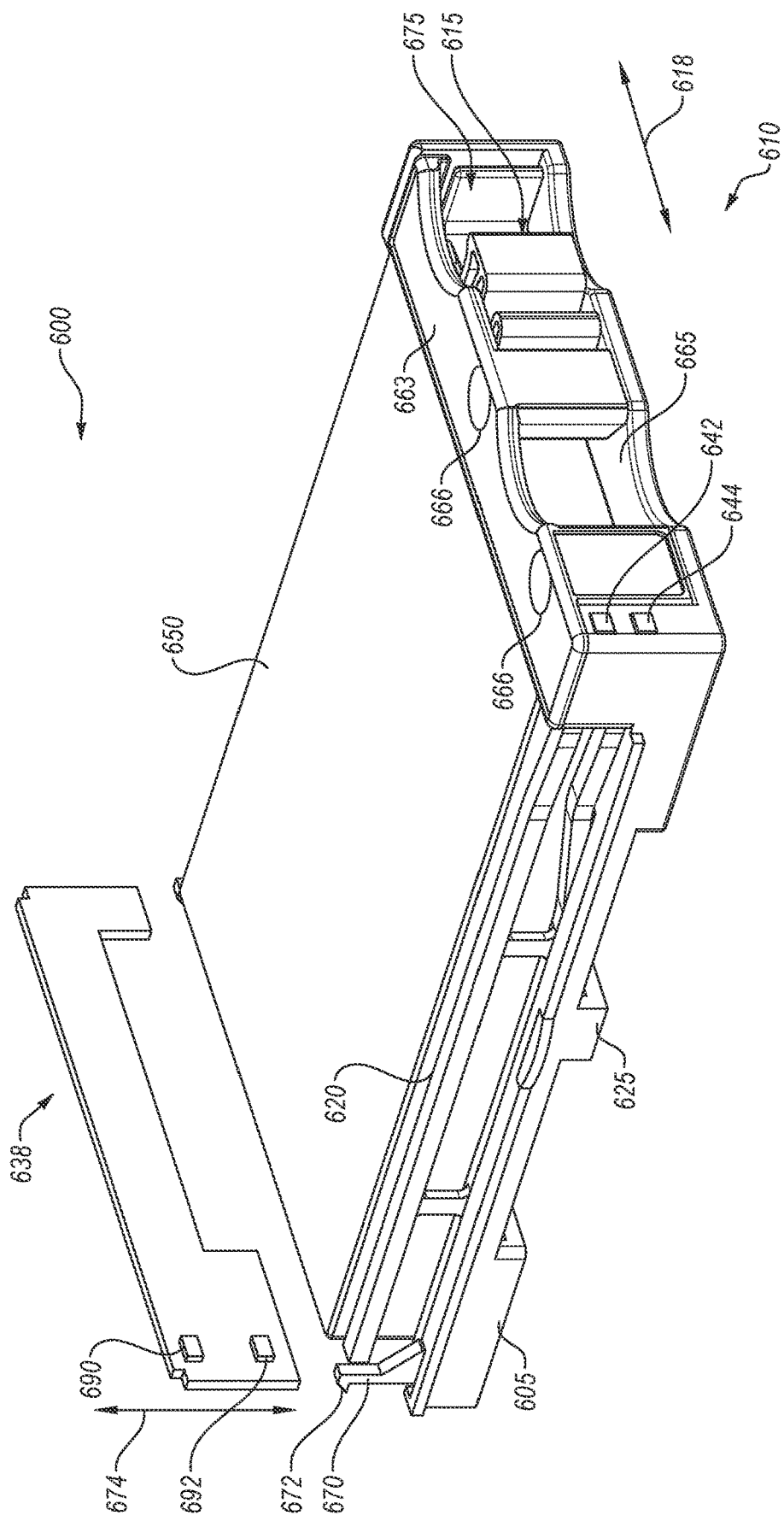

FIGS. 6A-C illustrate various views of a plastic drive caddy assembly 600, in accordance with one embodiment of the present disclosure. The plastic drive caddy assembly 600 may have an SSD 650 and/or PCB 638 mounted thereto, and the plastic drive caddy assembly 600 and mounted SSD 650 and/or PCB 638 may together form an FRU. In embodiments, plastic drive caddy assembly 600 may be shorter than plastic drive caddy assembly 400 and plastic drive caddy assembly 500. Plastic drive caddy assemblies 400, 500 may have sufficient length to accommodate an SSD and a horizontally mounted PCB that plugs into a port of the SSD and that further plugs into a port of a fabric (for embodiments in which they include such a PCB). However, for plastic drive caddy assembly 600, PCB 638 is vertically oriented and takes up much less space than PCBs 438, 538. Accordingly, plastic drive caddy assembly 600 may be only slightly longer than a length of SSD 650.

Drive caddy assembly 600 includes plastic frame 605 which may be a rigid body that is used to couple other components together to form an FRU. Plastic frame 605 may be a single solid plastic body. The plastic frame 605 may include one or more cross beams 625 that both support SSD 650 and that increase a rigidity of the plastic frame 605. Plastic frame 605 may include multiple holes or indentations (not shown) that may be configured to line up with screw holes in SSD 650. Additionally, or alternatively, one or more holes or indentations may be replaced by bumps or protrusions that are configured to line up with screw holes in SSD 650.

The plastic frame 605 may have been manufactured using injection molding or by three-dimensional (3D) printing. The drive caddy assembly 600 may include a plastic faceplate 610 attached to a front of the plastic frame 605, a light pipe 620 attached to a side of the plastic frame 605, and SSD 650 attached to the plastic frame 605 behind the plastic faceplate 610. Additionally, the drive caddy assembly 600 may include vertically mounted PCB 638 attached to the plastic frame 605. The plastic frame 605 may enable SSD 650 and PCB 638 to be part of a single FRU.

The PCB 638 includes a port 640 that is to couple to a transport fabric of a storage server, such as storage server 101. The port 640 may include a zero force connector to bring a signal from the backplane (e.g., fabric) and back to the SSD. The backplane may include PCB pads, but may not otherwise include a mating connector for connecting with the zero force connector of port 640. Port 640 may be a serial port or a parallel port. In one embodiment, SSD 650 connects directly to the backplane or transport fabric. SSD 650 may support connection to multiple fabrics, and may include an internal multiplexer in embodiments.

PCB 638 may include multiple active components 678, 680, 682, and may additionally include light emitter 690 and light emitter 692. Light pipe 620 is connected to one side of the plastic frame 605. Light pipe 620 may be a single solid plastic body. The light pipe 620 may have been manufactured using injection molding or by three-dimensional (3D) printing. In embodiments, the light pipe 620 is formed from a different type of plastic than the plastic frame 605 or plastic faceplate 610. In particular, the plastic frame 605 and plastic faceplate 610 may be manufactured from plastics that are opaque or non-transparent for visible light. In contrast, the plastic light pipe 620 may be manufactured from a plastic that is transparent (or at least partially transparent) for visible light. The light pipe 620 may include a first light pipe portion that guides light from the first light emitter to a cutout or hole 642 in the plastic faceplate 610 and/or plastic frame 605 and a second light pipe portion that guides light from the second light emitter to a cutout or hole 644 in the plastic faceplate 610 and/or plastic frame 605. This enables a user or technician to be able to see the status of the SSD and/or PCB 638 by glancing at the plastic faceplate 610 when the drive caddy assembly 600 is installed in a storage server.

PCB 638 may be inserted approximately vertically into a back end of the plastic frame 605 (e.g., along axis 674). Plastic frame 605 may include a vertical member 670 with a protrusion 672 that engages with a notch 684 in the PCB 638 and that secures the PCB 638 to the plastic frame 605.

In one embodiment, the PCB 638 is a drive control interposer (also referred to as an interposer board). The drive control interposer may include all active components responsible for drive control and operation of the SSD 650 (that would traditionally be located on the drive backplane or transport fabric of the storage server into which the drive caddy assembly 600 is inserted). By moving the active components responsible for drive control and operation of the SSD onto the interposer board, reliability of the storage server may be increased and maintenance may be simplified. If any component of the interposer fails, then the drive caddy assembly 600 may be removed from the storage server and the drive control interposer may be replaced without a need to remove and replace the entire backplane or transport fabric. This approach greatly improves system availability (one caddy can be replaced in the field quickly without affecting the rest of the system) and over all data safety (having RAID structure allows multiple drive failures without data loss versus losing complete backplane with many drives leading to the potential data loss). In one embodiment, the drive control interposer does not include a multiplexer. Instead, the SSD itself may be capable of connecting to two different fabrics without the user of a multiplexer. As shown, a port 640 of the SSD 650 is exposed (i.e., not blocked) by the PCB 638, and is able to plug into a backplane or fabric. In other embodiments, the drive control interposer does include a multiplexer, and further includes an additional port for connecting with the port of the SSD 650.

In one embodiment, the PCB 638 includes an I2C expander to control e-fuses, to control LEDs and to detect drive presence (in case of empty caddy). In one embodiment, PCB 638 includes light emitters 690, 692 (e.g., LEDs) as well as LED controls. The light emitters 690, 692 may indicate drive status, drive activity and/or identification. In one embodiment, the PCB includes a 100 Mhz clock generator for PCIe operations, a hot plug I2C buffer with enable function, and/or e-fuses to protect 12V and 3.3V power coming to the SSD 650.

Plastic faceplate 610 attaches to a front of plastic frame 605. Plastic faceplate 610 may be a single solid plastic body. Plastic faceplate 610 may have been manufactured using injection molding or by three-dimensional (3D) printing.

Plastic faceplate 610 and/or plastic frame 605 includes cutouts or holes 642, 644 that are configured to receive ends of light pipe 620. Plastic faceplate 610 and/or plastic frame 605 may include symbols or labels formed near cutouts or holes 642, 644 that depict a meaning of light conveyed through cutouts or holes 642, 644.

Plastic faceplate 610 may correspond to any of the aforementioned plastic faceplates. For example, plastic faceplate may include a plastic spring 615 configured to move along a spring axis 618 that is perpendicular to a longitudinal axis (illustrated as the Z axis) of the drive caddy assembly. In one embodiment, the plastic spring 615 includes a plastic tab 622 extending from a side of the plastic spring 615. In one embodiment, the plastic tab 622 is configured to engage with the drive receptacle of the storage server in a manner that translates a force on the drive caddy assembly 600 along the longitudinal axis of the drive caddy assembly (e.g., along the Z axis) applied during insertion of the drive caddy assembly 600 into the drive receptacle into a force on the plastic spring 615 along the spring axis 618. In one embodiment, the plastic tab 622 includes an angled portion (e.g., at an angle of about 45 degrees or about 30-60 degrees) to the longitudinal axis and/or to the spring axis 618.

In one embodiment, plastic frame 605 includes a side wall 632 positioned on a side of the plastic faceplate 610. Side wall 632 includes a cutout or slot 636 that engages with a plastic tab 634 extending from a side of the plastic faceplate 610 to secure the plastic faceplate 610 to the plastic frame 605. In one embodiment, the side wall 632 further includes a cutout or slot 623 that is positioned and sized to receive the plastic tab 622 extending from the plastic spring 615. The plastic tab 622 and the slot 623 together act as a motion limiter that limits motion of the plastic spring 615 along the longitudinal axis of the drive caddy assembly.

In one embodiment, a first region 665 of the plastic frame 605 restricts motion of the plastic spring 615 in a first direction along an axis that is perpendicular to both the spring axis 618 and the longitudinal axis of the drive caddy assembly 600 (e.g., along the Y axis). Additionally, a second region 663 of the plastic faceplate 610 (or the plastic frame 605) restricts motion of the plastic spring 615 in a second direction along the axis that is perpendicular to both the spring axis 618 and the longitudinal axis, wherein the second direction is opposite the first direction.

Plastic faceplate 610 may be removable from plastic frame 605 in embodiments. In one embodiment, the plastic faceplate 610 includes one or more engagement features 666 (e.g., one or more female engagement features that engage with one or more engagement features (not shown) (e.g., one or more male engagement features) of the plastic frame 605.

Engagement features of the plastic frame 605 may be cylinders of a first diameter with mushroom-shaped heads having a larger second diameter. The cylinders may include cutouts that enable the cylinders to compress radially towards a center of the cylinders when they are inserted into engagement features of plastic faceplate 610. Engagement features 666 of plastic faceplate 610 may be holes in plastic faceplate 610 configured to receive engagement features of plastic frame 605. Engagement features 666 of plastic faceplate 610 may include first holes extending from a bottom of plastic faceplate 610 having a first diameter and second holes extending from a top of plastic faceplate 610 and meeting the first holes, the second holes having a larger second diameter than the first diameter. When plastic faceplate 610 is fully seated on plastic frame 605, the mushroom-shaped heads of engagement features of the plastic frame 605 may extend into engagement features 666 of the plastic faceplate 610, locking the plastic faceplate 610 to the plastic frame 605.

Figure 7:
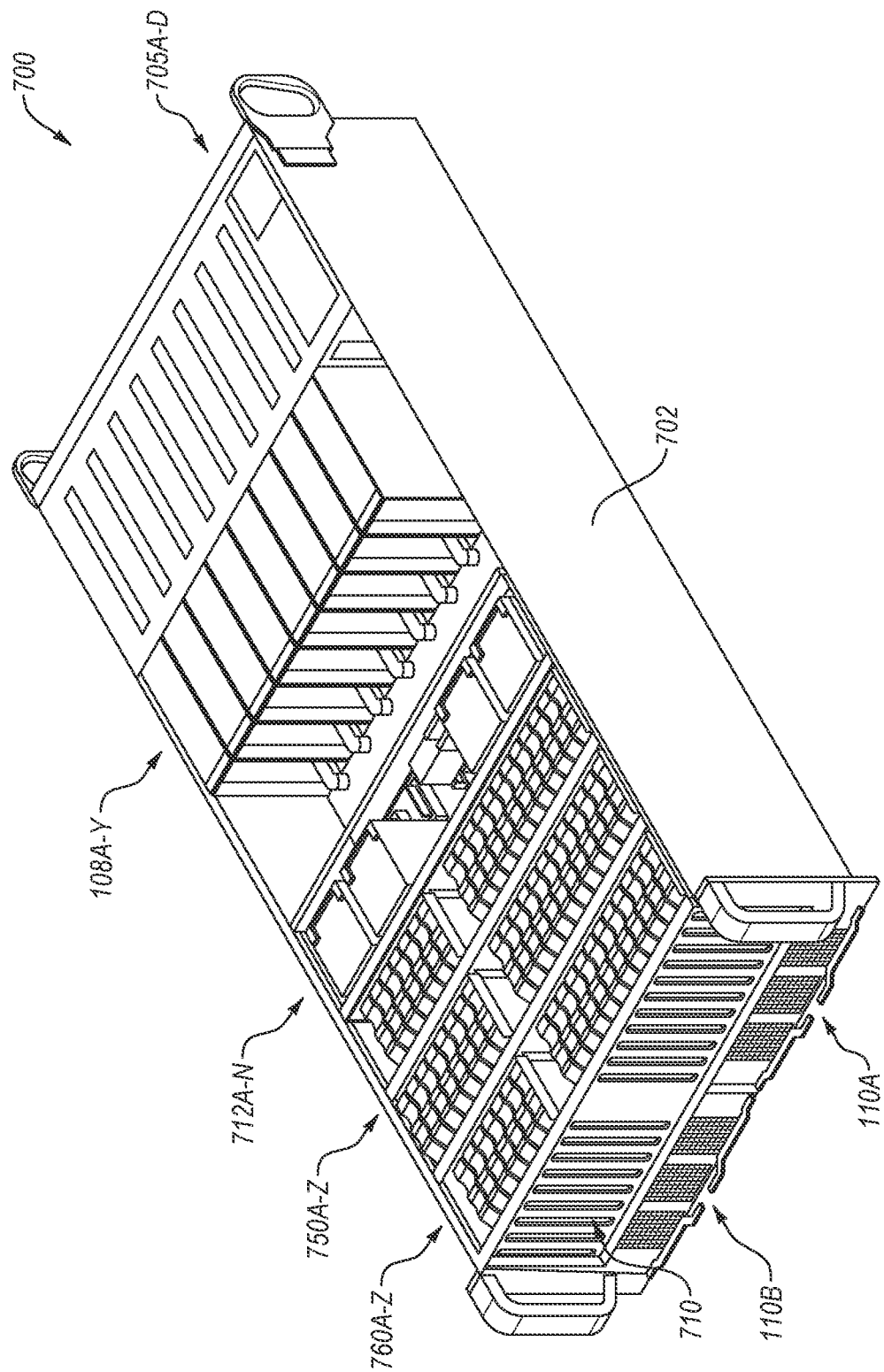
FIG. 7 illustrates a view of a storage server into which multiple plastic drive caddy assemblies have been inserted, in accordance with one embodiment of the present disclosure.

FIG. 7 illustrates a view of a storage server 700 into which multiple plastic drive caddy assemblies 750A-Z have been inserted, in accordance with one embodiment of the present disclosure. In some embodiments, storage server 700 corresponds to storage server 150 of FIG. 1. Storage server 700 includes a chassis 702 that houses components of the storage server 700. Storage server 700 may have a form factor of a blade server in embodiments. In one embodiment, the storage server has a height of three rack units (RU) to four RU, where an RU has a height of about 1.75 inches. In one embodiment, the chassis has a height of about 7 inches.

Components housed within the chassis include drive caddy assemblies 750A-Z, fan FRUs 712A-N, fabrics 110A, 190B, a mid-plane 708, IO controllers 108A-Y, and power supply units (PSUs) 705A-D. In embodiments, each of the SSDs 150A-Z, PSUs 705A-D, fan FRUs 712A-N, fabrics (not shown), and IO controllers 108A-Y may be removable and replaceable without affecting the operation of any other component (e.g., without affecting the operation of any SSD in any drive caddy assembly 750A-Z, PSU 705A-D, fan FRU 712A-N, fabric, or IO controller 108A-Y other than the one being replaced or serviced). In one embodiment, any type of component selected from the plurality of SSDs, the plurality of IO controllers, the plurality of fabrics, the plurality of PSUs and the plurality of fan FRUs is replaceable without affecting any other type of component selected from the plurality of SSDs, the plurality of IO controllers, the plurality of fabrics, the plurality of PSUs and the plurality of fan FRUs.

Storage server 700 includes multiple IO controllers 108A-Y. In one embodiment, the storage server 700 includes 8 IO controllers, as shown. Alternatively, storage server 700 may include other numbers of IO controllers 108A-Y. IO controllers 108A-Y are connected to a mid-plane (not shown) in embodiments. Each IO controller 108A-Y is an FRU that can be removed from the back of the of the storage server 700. In one embodiment, the IO controllers 108A-Y are hot swappable, meaning that they can be removed and replaced while storage server is in operation. In one embodiment, IO controllers 108A-Y are horizontally inserted into the back of the storage server. IO controllers 108A-Y may be positioned above and/or behind the mid-plane and to the side of one or more power supply units 705A-D.

Storage server 700 includes multiple PSUs 705A-D. In one embodiment, the storage server 700 includes 4 PSUs, as shown. A first pair of PSUs (e.g., PSU 705A and PSU 705B) may power the storage server, and a second pair of PSUs (e.g., PSU 705C and PSU 705D) may also power storage server 700. A first PSU from the first pair of PSUs and a first PSU from the second pair of PSUs may be connected with a first power source (e.g., a first AC power source), and a second PSU from the first pair of PSUs and a second PSU from the second pair of PSUs may be connected with a second power source (e.g., a second AC power source). Thus, if one of the power sources fails, the remaining two PSUs may still power the storage server 700, and if any of the PSUs fails, the remaining PSUs may still power the storage server 700, and if a power source fails, and a PSU on the other power source fails, there is still sufficient power from the single remaining PSU to power the storage server for at least a limited amount of time.

In one embodiment, each PSU 750A-D is an FRU that can be removed from the back of the storage server 700. In one embodiment, the PSUs 705A-D are hot swappable. In one embodiment, PSUs 705A-D are horizontally inserted into the back of the storage server. PSUs 705A-D may be positioned to the side of IO controllers 108A-Y. In embodiments, PSUs 705A-D can be removed from chassis 702 without moving the chassis 702 relative to a rack to which it is mounted.

Storage server 700 includes a rail that is connected to a slidable drive tray 710. Slidable drive tray 710 is at a front and top of the chassis 702 in one embodiment, as shown. Slidable drive tray 710 is therefore coupled to the chassis, and is slidable along a chassis axis (e.g., a horizontal axis that extends from front to back of the storage server 700) between an open position and a closed position.

The storage server 750 includes a plurality of receptacles 760A-Z, each of which accommodates one of a plurality of drive caddy assemblies 750A-Z mounted to the slidable tray 710. The plurality of drive caddy assemblies 750A-Z are vertically mounted into the slidable tray 710 and are accessible while the slidable tray 710 is in the open position. Slidable tray 710 may include one or more PCB mounted thereto, and SSDs and/or PCBs of the drive caddy assemblies 750A-Z may plug into ports of the one or more PCBs. SSDs in the drive caddy assemblies 750A-Z may have the same form factor or different form factors. One or more of SSDs may be 2.5" dual port NVMe drives. One or more of SSDs may be enterprise and data center form factor (EDSFF) drives. In one embodiment, one or more of the drive caddy assemblies 750A-Z are removable vertically from the front of the chassis 702. The drive caddy assemblies 750A-Z may be configured such that they can be removed vertically without imposing any horizontal force or rotational force on the drive caddy assemblies 750A-Z. This may prolong a life of the drive caddy assemblies 750A-Z (e.g., of PCBs attached to the drive caddy assemblies).

As shown, the design of the slidable tray and of the drive caddy assemblies 750A-Z enables the drive caddy assemblies 750A-Z and the SSDs attached thereto to be densely packed in the storage server. In one embodiment, the SSDs are arranged in the storage server with a high density.

Storage server 700 may include multiple fan FRUs 712A-N connected to the slidable tray 710. The plurality of fan FRUs 712A-N are configured to cool the plurality of SSDs 150A-Z, wherein each fan FRU of the plurality of fan FRUs is accessible while the slidable tray is in the open position and is removable from the slidable tray without moving the chassis relative to the rack. Each of the fan FRUs 712A-N may be vertically mounted to the slidable tray and vertically removable from the slidable tray 710. Each fan FRU 712A-N may be hot swappable. In one embodiment, as shown, fan FRUs 712A-N are positioned at a back of the slidable tray 710 behind SSDs 150A-Z.

Storage server 700 includes two fabrics 110A-B in one embodiment. Each of the fabrics 110A-B may be connected to a mid-plane. In one embodiment, fabrics 110A-B plug into connectors of the mid-plane. Fabrics 190A-B may be horizontally mounted to the chassis 702, and may be removed by horizontally sliding them out of the front of the chassis 702. In one embodiment, each fabric 110A-B includes a PCB on a sled that can be slid horizontally out of the front of the chassis 702. In one embodiment, each of the fabrics 110A-B is a field replaceable unit (FRU) that is removable from a front of the chassis without moving the chassis relative to the rack. The fabrics 110A-B may be positioned side-by-side and beneath the slidable tray 710. Each of the fabrics 110A-B may be hot swappable.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A drive caddy assembly for a storage device, comprising:
   a plastic frame; and
   a plastic faceplate attached to the plastic frame, wherein the plastic faceplate comprises:
      a plastic spring that moves along a spring axis that is perpendicular to a longitudinal axis of the drive caddy assembly, wherein the plastic spring is configured to compress from a resting state along the spring axis without moving perpendicular to the spring axis during insertion of the drive caddy assembly into a drive receptacle of a storage server, and wherein the plastic spring is further configured to return to the resting state when the drive caddy assembly is fully seated in the drive receptacle; and
a first plastic tab extending from a side of the plastic spring, wherein the first plastic tab is configured to:
a) engage with the drive receptacle in a manner that translates a force on the drive caddy assembly along the longitudinal axis applied during insertion of the drive caddy assembly into the drive receptacle into a force on the plastic spring along the spring axis; and
b) interface with a slot of the drive receptacle to secure the drive caddy assembly and the storage device to the drive receptacle when the drive caddy assembly is fully seated in the drive receptacle and the plastic spring is in the resting state.

2. The drive caddy assembly of claim 1, wherein:
the plastic frame consists of a first single plastic body; and
the plastic faceplate consists of a second single plastic body.

3. The drive caddy assembly of claim 1, wherein the plastic spring has a corrugated shape.

4. The drive caddy assembly of claim 1, further comprising:
a printed circuit board (PCB) attached to the plastic frame, the PCB comprising:
a first serial port, connected to the PCB, having a first number of lanes usable to form a first multi-lane link to the storage device; and
a second serial port, connected to the PCB, having a second number of lanes usable to form a second multi-lane link to at least one of a first transport fabric of the storage server or a second transport fabric of the storage server.

5. The drive caddy assembly of claim 4, wherein the PCB further comprises a first light source and a second light source, the drive caddy assembly further comprising:
a plastic light pipe attached to the plastic frame, wherein the plastic light pipe directs light from at least one of the first light source or the second light source to the plastic faceplate.

6. The drive caddy assembly of claim 1, wherein:
the plastic frame comprises a slot that is parallel to the spring axis; and
the plastic faceplate comprises a second plastic tab that extends from a bottom of the plastic spring into the slot, wherein the second plastic tab and the slot together act as a motion limiter that limits motion of the plastic spring along the longitudinal axis of the drive caddy assembly.

7. The drive caddy assembly of claim 1, wherein a first region of the plastic frame restricts motion of the plastic spring in a first direction along an axis that is perpendicular to both the spring axis and the longitudinal axis of the drive caddy assembly, and wherein a second region of the plastic faceplate or the plastic frame restricts motion of the plastic spring in a second direction along the axis that is perpendicular to both the spring axis and the longitudinal axis, wherein the second direction is opposite the first direction.

8. The drive caddy assembly of claim 1, wherein at least one of the plastic frame or the plastic faceplate is an injection molded component of the drive caddy assembly.

9. The drive caddy assembly of claim 1, wherein at least one of the plastic frame or the plastic faceplate is three-dimensionally printed component of the drive caddy assembly.

10. The drive caddy assembly of claim 1, wherein the plastic frame comprises:
a side wall that interfaces with the plastic spring, the side wall comprising:
a first slot that engages with a second plastic tab extending from a side of the plastic faceplate to secure the plastic faceplate to the plastic frame; and
a second slot that receives the first plastic tab extending from the plastic spring, wherein the first plastic tab and the second slot together act as a motion limiter that limits motion of the plastic spring along the longitudinal axis of the drive caddy assembly.

11. A storage server, comprising:
a chassis;
a plurality of drive receptacles within the chassis, wherein each drive receptacle of the plurality of drive receptacles is configured to receive a drive caddy assembly and a solid state drive (SSD) attached to the drive caddy assembly; and
a plurality of drive caddy assemblies, each of the plurality of drive caddy assemblies seated in one of the plurality of drive receptacles and comprising:
a plastic frame;
an SSD attached to the plastic frame; and
a plastic faceplate attached to the plastic frame, wherein the plastic faceplate comprises:
a plastic spring having a corrugated shape that moves along a spring axis that is perpendicular to a longitudinal axis of the drive caddy assembly, wherein the plastic spring is configured to compress from a resting state along the spring axis without moving perpendicular to the spring axis during insertion of the drive caddy assembly into a drive receptacle of the plurality of drive receptacles, and wherein the plastic spring is further configured to return to the resting state when the drive caddy assembly is fully seated in the drive receptacle; and
a first plastic tab extending from a side of the plastic spring, wherein the first plastic tab is configured to:
a) engage with the drive receptacle in a manner that translates a force on the drive caddy assembly along the longitudinal axis applied during insertion of the drive caddy assembly into the drive receptacle into a force on the plastic spring along the spring axis; and
b) interface with a slot of the drive receptacle to secure the drive caddy assembly to the drive receptacle when the drive caddy assembly is fully seated in the drive receptacle and the plastic spring is in the resting state.

12. The storage server of claim 11, wherein:
the plastic frame consists of a first single plastic body; and
the plastic faceplate consists of a second single plastic body.

13. The storage server of claim 11, wherein each drive caddy assembly further comprises:
a printed circuit board (PCB) attached to the plastic frame, the PCB comprising:
a first serial port, connected to the PCB, having a first number of lanes usable to form a first multi-lane link to the SSD; and
a second serial port, connected to the PCB, having a second number of lanes usable to form a second multi-lane link to at least one of a first transport fabric of the storage server or a second transport fabric of the storage server.

14. The storage server of claim 13, wherein the PCB further comprises a first light source and a second light source, the drive caddy assembly further comprising:
  a plastic light pipe attached to the plastic frame, wherein the plastic light pipe directs light from at least one of the first light source or the second light source to the plastic faceplate.

15. The storage server of claim 11, wherein:
  the plastic frame comprises a slot that is parallel to the spring axis; and
  the plastic faceplate comprises a second plastic tab that extends from a bottom of the plastic spring into the slot, wherein the second plastic tab and the slot together act as a motion limiter that limits motion of the plastic spring along the longitudinal axis of the drive caddy assembly.

16. The storage server of claim 11, wherein a first region of the plastic frame restricts motion of the plastic spring in a first direction along an axis that is perpendicular to both the spring axis and the longitudinal axis of the drive caddy assembly, and wherein a second region of the plastic faceplate or the plastic frame restricts motion of the plastic spring in a second direction along the axis that is perpendicular to both the spring axis and the longitudinal axis, wherein the second direction is opposite the first direction.

17. The storage server of claim 11, wherein at least one of the plastic frame or the plastic faceplate is an injection molded component of the drive caddy assembly.

18. The storage server of claim 11, wherein at least one of the plastic frame or the plastic faceplate is three-dimensionally printed component of the drive caddy assembly.

19. The storage server of claim 11, wherein the plastic frame comprises:
  a side wall that interfaces with the plastic spring, the side wall comprising:
    a first slot that engages with a second plastic tab extending from a side of the plastic faceplate to secure the plastic faceplate to the plastic frame; and
    a second slot that receives the first plastic tab extending from the plastic spring, wherein the first plastic tab and the second slot together act as a motion limiter that limits motion of the plastic spring along the longitudinal axis of the drive caddy assembly.

* * * * *